United States Patent
Fenney

(10) Patent No.: US 7,242,811 B2
(45) Date of Patent: Jul. 10, 2007

(54) METHOD AND APPARATUS FOR COMPRESSING DATA AND DECOMPRESSING COMPRESSED DATA

(75) Inventor: Simon Fenney, Hertfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 761 days.

(21) Appl. No.: 10/310,124

(22) Filed: Dec. 3, 2002

(65) Prior Publication Data

US 2003/0138152 A1    Jul. 24, 2003

(30) Foreign Application Priority Data

Dec. 3, 2001    (GB) ................ 0128888.5

(51) Int. Cl.
*G06K 9/36* (2006.01)
(52) U.S. Cl. .............. 382/240; 382/232; 382/233; 382/238
(58) Field of Classification Search ........... 382/240, 382/238, 232, 233; 345/552, 586; 708/654; 348/473, 486
See application file for complete search history.

(56) References Cited

U.S. PATENT DOCUMENTS

| | | | |
|---|---|---|---|
| 4,290,084 A | 9/1981 | Minshull et al. | 358/451 |
| 5,956,431 A | 9/1999 | Iourcha et al. | 382/253 |

FOREIGN PATENT DOCUMENTS

| | | |
|---|---|---|
| EP | 0 617 554 A1 | 9/1994 |
| GB | 2 265 785 | 10/1993 |
| GB | 2 266 635 | 11/1993 |
| WO | WO 99/63489 | 12/1999 |
| WO | WO 03/036983 A2 | 5/2003 |

OTHER PUBLICATIONS

Campbell, G. et al., "Two Bit/Pixel Full Color Encoding", *Computer Graphics Proceedings, Annual Conference Series*, vol. 20, No. 4, Aug. 1, 1986, pp. 215-223.

Hang, H. -M. et al., Interpolative Vector Quantization of Color Images, *IEEE Transactions on Communications*, vol. 36, No. 4, Apr. 1988, pp. 465-470.

(Continued)

*Primary Examiner*—Anh Hong Do
(74) *Attorney, Agent, or Firm*—Flynn, Thiel, Boutell & Tanis, P.C.

(57) ABSTRACT

A method and apparatus are provided for compressing data representing a plurality of elements of an array. This data is compressed by generating at least two sets of reduced size data from a filtered version of the original data. The elements of each set of reduced size data are representative of a plurality of elements of the original data. The original data is then used to generate modulation data, each element of the modulation data specifying how to combine the sets of reduced size data to generate an approximation to the original data. The sets of reduced size data and modulation data are stored as compressed data. Further method and apparatus are provided for accessing these compressed data and for decompressing it.

80 Claims, 14 Drawing Sheets

OTHER PUBLICATIONS

Kwon, Y. -S. et al., "Pyramid Texture Compression and Decompression using Interpolative Vector Quantization", *Proceedings of the 7th IEEE International Conference on Image Processing*, Vancouver, BC, Canada, Sep. 10-13, 2000, vol. 2, pp. 191-194.

Ramasubramanian, D. et al., "A Hybrid Wavelet Compression Scheme for Material Textures", *IEEE Comput. Soc. USA, Proceedings of the 2nd International Workshop on Digital and Computational Video*, Feb. 9, 2001, pp. 187-193.

Search Report of the United Kingdom Patent Office dated Dec. 16, 2005 (2 pages).

Triangle being textured during 3D rendering

Section of texture being applied

Worst Case Situation for Bilinear Filtering (a)  (b)  (c)

Graph of low frequency A and B signals (using cubics rather than linear) and the resulting modulated output:

Actual modulation values:

METHOD AND APPARATUS FOR COMPRESSING DATA AND DECOMPRESSING COMPRESSED DATA

This invention relates to a method of, and apparatus for, compressing data and a method of, and apparatus for, decompressing data. The invention may be used in a computer graphics systems, and in particular, in a computer graphics system that generates three-dimensional images using texturing by applying texture image data to 3D surfaces.

BACKGROUND TO THE INVENTION

In 3D computer graphics, surface detail on objects is commonly added through the use of image-based textures, as first introduced in 1975 by Ed Catmull ("Computer Display of Curved Surfaces", Proc. IEEE Comp. Graphics, Pattern Recognition and Data Structures. May 1975). For example, an image of a sheet of wood may be applied to a set of polygons representing a 3D model of a chair to give the 3D rendering of that object the appearance that it is made of timber.

In a complex 3D scene, many such 'textures' may be required which can cause two related problems. The first is simply the cost of storing these textures in memory. Consumer 3D systems, in particular, only have a relatively small amount of memory available for the storage of textures and this can rapidly become filled. This is especially aggravated by the use of so called 'true colour' textures which typically have 32 bits per texture pixel—eight bits for each of the Red, Green, Blue, and Alpha (translucency) components.

The second, and often more critical problem, is that of bandwidth. During the rendering of the 3D scene, a considerable amount of texture data must be accessed. In a real-time system, this can soon become a significant performance bottleneck.

One approach to alleviate both of these problems is to use a form of image compression. Numerous such systems, for example the JPEG standard, are in use in image processing and transmission, but very few are suitable for real-time 3D computer graphics. The main problem with the majority of these compression schemes is that they do not permit direct 'random access' of pixel data within the compressed format, and fast arbitrary access is a requirement of the texturing process. This random access is often not possible because the per-pixel storage rate varies throughout the image, and so the schemes that have been proposed and/or implemented to compress texture data are usually restricted to fixed rate encoding.

Another requirement of any system that compresses texture is that the decompression process must be fast and inexpensive to implement in hardware. This usually eliminates 'transform coding' systems such as the discrete cosine transform, DCT, used in JPEG.

The most frequently used system is one based on colour palettes, which was originally used as a method of reducing the memory and bandwidth costs of video framebuffers. (see: "A Random-Access Video Frame Buffer", Kajiya, Sutherland, Cheadle, Proceedings IEEE Comp. Graphics, Pattern Recognition, & Data Structures. May 1975). In such schemes, each pixel is represented by a small number of bits, typically 4 or 8, which stores an index into a table of colours, or palette, with 16 or 256 entries respectively. Numerous methods for reducing an original "true colour" image to this palettised format exist, with perhaps the best known being P. Heckbert's "Color Image Quantisation for Frame Buffer Display" (Computer Graphics Vol. 16, No. 3, July 1982, 297–307).

There are several drawbacks with the palette system. The first is that there is a level of indirection involved in decoding each texture pixel, also called a texel. A texel's index must first be read from memory and then the corresponding entry in the colour table must be accessed. Bringing the colour table 'on chip' or using dedicated RAM can 'hide' the time delay of the double read, but this too incurs additional penalties other than just the gate cost. For example, each time a new texture is accessed, the dedicated palette table must be reloaded. Alternatively a global palette could be used for all textures, but this would severely reduce the quality of the compressed images. Finally, the storage and bandwidth savings are not outstanding for 8 bits per pixel (or bpp) textures, and the quality of 4 bpp is generally poor.

Further cost complications arise due to texture filtering. Usually when a texture is applied to a surface, a weighted filter is applied to several sampled texels to avoid the texture appearing "blocky". Bilinear filtering is one commonly used method which also forms the basis for some more sophisticated techniques. For example, FIG. 1 illustrates a triangular surface '1' to which a texture '2' is being applied using bilinear filtering. The location of each screen pixel covered by the triangle, such as '3', is mapped back into the coordinate system of the texture, and the four texels surrounding this position are identified, '4'. A weighted average of these four texels are then used to compute the applied texture value.

In a real-time system it is preferable for the texel fetching system to be able to supply all the texels of this 2×2 block in parallel in order to allow the texturing process to operate at maximum speed. In a texturing system incorporating colour palette textures, these steps would involve fetching the indices for all four texels and then finding each texels' corresponding colour in the table. It can be appreciated that, unless it is multi-ported, the palette/colour table RAM could become a bottleneck. This represents an additional cost. (The problem of addressing multiple indices in parallel is identical to that of using non-compressed textures and so has been 'solved' in various ways in the art and need not be considered here).

Palettised textures are a form of vector quantisation compression, or VQ, and more complex forms have been used in 3D Computer Graphics. Beers et al ("Rendering from Compressed Textures", Computer Graphics, Proc. SIGGRAPH. August 1996, pp 373–378) simulated a hardware renderer that used VQ textures. This offered storage costs from around 2 bpp down to the equivalent of ½ bpp by replacing each 2×2 or 4×4 block of pixels with a single index into a large look-up table. A simpler VQ system, offering 2, 1, and ½ bpp compressed texture data rates, was implemented in hardware in the SEGA DREAMCAST™ games console. Interestingly, the two higher compression ratios in this system were achieved by combining two levels of vector quantisation.

Although these forms of VQ offer high levels of compression at reasonable quality, they still suffer from needing two memory accesses. Furthermore, the size of the look-up table is much greater than that of the palettised textures and so any internal storage or caching of the look-up table is more expensive. The filtering costs also become greater due to wider data structures.

There are also a number of alternative compression methods based on Block Truncation Coding, or BTC, as presented by Delp and Mitchell ("Image Compression Using Block Truncation Coding", IEEE Trans. Commun. Vol. COM-27, September 1979). In BTC, a monochrome image is subdivided into non-overlapping rectangular blocks, say, 4×4 pixels in size, and each block is then processed independently. Two representative values, say of 8 bits each, are chosen per block and each pixel within the block is quantised to either of these two values. The storage cost for each block in the example is therefore 16 * 1 bit plus 16 bits for the two representatives, thus giving an overall rate of 2 bpp. Because the blocks are independent, this simplifies the compression and decompression algorithms, however this could potentially lead to artefacts across block boundaries.

Cambell et al, ("Two bit/pixel full color encoding". SIGGRAPH '86 Conference Proceedings, Computer Graphics, Vol. 20, No. 4, August 1986, pages 215–223) introduced Color Cell Compression, CCC, which extended BTC to encode colour images at 2 bpp. Unfortunately this required an external palette and the example images also show some evidence of colour banding. Despite these shortcomings, Knittel et al ("Hardware for Superior Texture Performance", Proceedings of the 10th Eurographics Workshop on Graphics Hardware, 33–39, 1995) suggested using these image compression schemes in a texturing system.

In U.S. Pat. No. 5,956,431, Iourcha et al also adapt the BTC method to encode colour. In Iourcha's system, often referred to as S3TC or DXTC, each block stores two representative colours, typically at 16 bits each. Each pixel in the block is encoded typically using two bits and so can refer to four different values. Two of these values reference the two representative colours while the other two reference two colours that are derived directly from the two representatives. Usually the two derived colours are linear blends of the main representative colours, although sometimes one of the other values is chosen to indicate a fully transparent pixel. As with BTC, each block is completely independent of every other block.

The quality of the S3TC system is generally higher than that given by CCC and avoids the need for a colour palette, but these advantages are achieved at the price of approximately doubling the storage costs to 4 bpp. Furthermore, because this compression method is limited to only four colours per block, certain textures have been known to display banding. Also, as with BTC, there may be some artefacts at block boundaries.

If we consider bilinearly filtering a texture compressed with the S3TC system, we see that although in many cases the 2×2 set of texels required for the weighted filter could be fetched from a single 4×4 pixel block, there exist situations where more blocks are needed. The worst case situation, as shown in FIG. 2, arises when each pixel of the 2×2 set, '10', belongs to a different 4×4 block, '11'. A real-time system that could texture one bilinearly filtered screen pixel per clock would therefore have to be able to access and decode four blocks in parallel.

Another scheme that mixes a block-based system with a palette-like approach has been presented by Ivanov & Kuzmin. ("Color Distribution—A New Approach to Texture Compression", Eurographics 2000). Here each block stores at least one base colour but a local palette is implied by allowing access to a certain set of the neighbouring blocks' base colours. In an example system, the local palette for a particular block may have access to the base colours from an additional 3 neighbouring blocks—for example the choice might be to use the base colour from the block to right, the one below, and the one to the 'below and right'. Each texel in a block would thus be represented by a two bit index accessing one of the four available base colour choices. This system would need a cache of base colours in order for it to be efficient since it would still be expensive to repeatedly access the neighbouring colours. Note also that the worst-case situation for bilinear filtering with this scheme can involve access to any of nine different blocks—this is shown in FIG. 3, where to decode pixel 20, access to one of the base colours of blocks 21, 22, 23, and 24 is required while for pixel 25, access to one of 24, 26, 27, and 28 is needed.

Another texture compression scheme, called FXT1, was published in 1999 by 3 dfx Interactive, Inc. This used 8×4 blocks, each of which could be compressed in four different ways. One such block mode was similar to the S3TC (CC_MIXED), while another, (CC_CHROMA) stored a local 4 colour palette which could be indexed directly.

Although not directly applicable to texture compression, multi-resolution image analysis and wavelet techniques (e.g. as described in "Wavelets for Computer Graphics. Theory and Applications", Stollnitz, DeRose, & Salesin. ISBN 1-55860-375-1) has been applied to image compression with some success. This technique makes use of the fact that a low-resolution version of an image, which is subsequently scaled up, is frequently a good approximation of the original image.

FIG. 4a illustrates this process with a grey-scale image (due to the restrictions of monochromatic printing). The source image, '40', is filtered down by a factor of four in both the x and y dimensions to produce a low-resolution version, '41', that has 16 times less data. In this example a linear wavelet has been applied twice in both the x and y directions and the difference signals discarded. This has then been bilinearly scaled up to produce the low frequency image, '42'. The difference between this and the original signal is shown (amplified for illustrative purposes) in '43'.

The difference signal needed to reconstruct the original image from the scaled version often requires very few bits per pixel. In fact frequently a lot of the data can be thrown away to give a lossy compression system. This works well for natural images, but graphics, e.g., line drawings or text, often has a much greater amount of information in the delta signal and so the technique may not produce a good compression rate for this class of images. (This is analogous to the ringing artefacts frequently seen around text in a JPEG-compressed diagram).

The present invention aims to provide better quality compression per bit of compressed data than that of S3TC. It uses a fixed rate of encoding or compression with a reasonably simple decompression algorithm. Unlike the CCC or VQ systems, the present invention does not require a secondary data structure such as a colour look-up table.

Drawing from work in the related image processing fields of wavelets, it has previously been noted that a down filtered and subsequently up-scaled image can be a reasonable approximation of the original. Just such a signal will be referred to as a low frequency signal. The inventor has appreciated that such signals can be efficiently constructed by sharing data associated with neighbouring groups or blocks of pixels.

The difference between the low frequency signal and the original image can be computed and will be referred to as the difference data or delta signal. Furthermore, the inventor has appreciated that for a great many textures, the delta signal, i.e. the difference between the low frequency signal and the original image, is locally relatively monochromatic. For example the pixels in one local region of the delta image might be predominantly blue-yellow (i.e. complementary colours).

By using the delta signal and the low frequency signal, two new low frequency signals, A and B, may be constructed so that each pixel of the original image can be closely approximated by a per pixel linear blend of the A and B signals. Returning to FIG. 4a, image '50' represents the image produced by the low frequency A signal, which in this example is an approximate 'lower' bound on the image, while '51' represents the image produced by the low frequency B signal and gives an approximate 'upper' bound. Note that in this example, both the A and B signals contain at least 16 times less information than the original image. Using A and B two sets of reduced size data, A' and B' respectively, may be generated and it is the sets of reduced size data A' and B' that are stored as the compressed data.

To perform the linear blend, a modulation signal is also required. This is illustrated by image 52 in FIG. 4b. Each pixel, (y,x, in this image represents a fractional value, $0 \leq \alpha_{y,x} \leq 1$, and is chosen so that $(1-\alpha_{y,x}).A_{y,x}+\alpha_{y,x}.B_{y,x}$ approximately equals the corresponding pixel in the original image.

Decompression of the texture proceeds by identifying the pixel to be decompressed and obtaining its modulation value, '53'. The data required to generate the low frequency A and B signals at that pixel are also obtained and used to produce the corresponding pixels in A, '54', and B, '55'. These are blended, '56', to produce the decompressed pixel, '57' Applying this process to all the pixels decompresses the entire image, '58'.

Note that the A and B signals, prior to up scaling, can be at relatively low resolution. For example, resolutions of four to eight times lower than the original texture will usually produce good quality images. Furthermore, very little per-pixel modulation data, typically one or two bits per pixel, is required. This is partly due to the fact that the human eye tends to mask noise in regions with large changes in luminance (according to Delp and Mitchell).

The present invention maintains the advantages of simple addressing that come from BTC and its variants, yet avoids many of the discontinuity problems that frequently occur at the block boundaries in that scheme. The invention is also optimised to decompress, in parallel, the four pixels required for a bilinear filtering operation.

The A & B signals can be produced by numerous functions, however tensor product surfaces, such as bilinear or bicubic functions, are suggested as a means of up scaling. This choice represents a trade-off of quality versus implementation cost.

The modulation data will typically be stored in an array of 'storage' blocks, with each 'storage' block containing information to produce N×M modulation values, where N and M typically correspond to the scaling factors used for the low frequency signals. The low resolution information needed to reconstruct the A & B signals can either be stored in a separate array, or alternatively one A&B low resolution pair could be kept inside each of the 'storage' blocks. The former system is advantageous if the up-scaling function is one such as bicubic which requires numerous data control points to perform the interpolation. The latter method is useful for simpler up-scaling functions such as bilinear which typically require few data control points.

If a system uses the former 'separate data storage' system and also maintains a cache of recently fetched modulation and A&B values, it is beneficial for bandwidth reasons to arrange the behaviour of up-scaling function so that the A & B values needed to decompress a particular section of texels is 'out of phase' with the required block modulation data.

That is, as a run of texels is accessed, the cache will generally be alternatively fetching modulation data and then A&B values as this should even out the requests to external memory. This is illustrated in FIG. 4c. In this example bilinear upscaling of the A & B data has been used. It shows a set of texels, '70', belonging to the image, of which texel '71' is to be decompressed. The 'storage' block containing the modulation value associated with texel '71' contains the modulation values for 4×4 adjacent texels, '72'. Because bilinear has been used, (up to) four pairs of A & B representative values, '73a', '73b', '73c', and '73d' are needed to generate the low frequency A & B signals for texel '71'. The adjacent texel, '74', uses the same set of modulation values, 72, but needs a slightly different set of A&B values, i.e. '73c', '73d', '73e', and '73f'. It is assumed that previous values used for texel '71' will still be residing in a cache. It should be appreciated that if the representative values for A & B were instead aligned on the corners of the '72', that although the average rate of data access would be the same, the peak data rate would have to be higher as both new modulation and A&B values would be fetched simultaneously. A second reason for preferring the out-of-phase arrangement is that it is natural to align blocks of modulation information with integer multiples of the block sizes. If the A&B values are also so aligned, then there is unevenness to the spread of representatives for the edges of the texture in that there is a preference for left and top edges.

The invention could also be extended to use a greater number of signals. For example, a third channel, C, could be introduced along with an additional per pixel modulation value. Barycentric coordinates could then be used to blend the signals.

The invention allows expansion of four neighbouring elements in parallel by for example, bilinear expansion or using tensor product surfaces. It recursively identifies quadrants and uses simple 90 degree rotations to map each of the four quadrant cases down to a single case. The calculations may be carried out at low precesion and expanded up to full precision.

The invention provides a means of encoding n-dimensional source data arranged in an m-dimensional array. The apparatus requires a means of generating P data signals, R, where P is two or greater, and where each of the signals also consists of n-dimensional data arranged in an m-dimensional array. Each of the R signals have fewer representative data elements than the original source data. Also provided is a means of obtaining or generating modulation information, M. The modulation data is also arranged in an m-dimensional array with the same number of elements as the original source data. Each datum in M consists of (P−1) scalar values. A means of storing the M and R data is provided. A means of interpolating each of the P individual R data signals to a one to one correspondence with that of the original source data and a means of applying M to the interpolated K data is provided. For each datum of the original source image, the corresponding M datum, consisting of (P−1) scalar values is used to interpolate via barycentric co-ordinates the corresponding P data items of the interpolated R signals. A means is also provided for optimising the stored R and M data such that, for the application of the M data to the interpolated R data, the result is near to the corresponding original datum.

The invention in its various aspects is defined in the independent claims below, to which reference should now be made. Advantageous features are set forth in the appendant claims.

Further adaptations and applications of embodiments of the invention will be described later.

Embodiments of the invention will now be described in more detail in accordance with the accompanying drawings in which.

Figure 10:
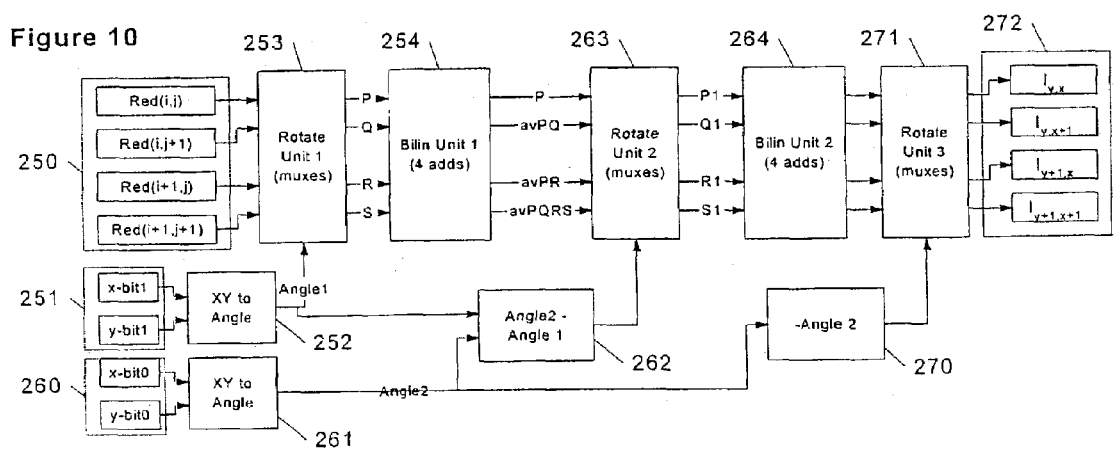
Figure 11:
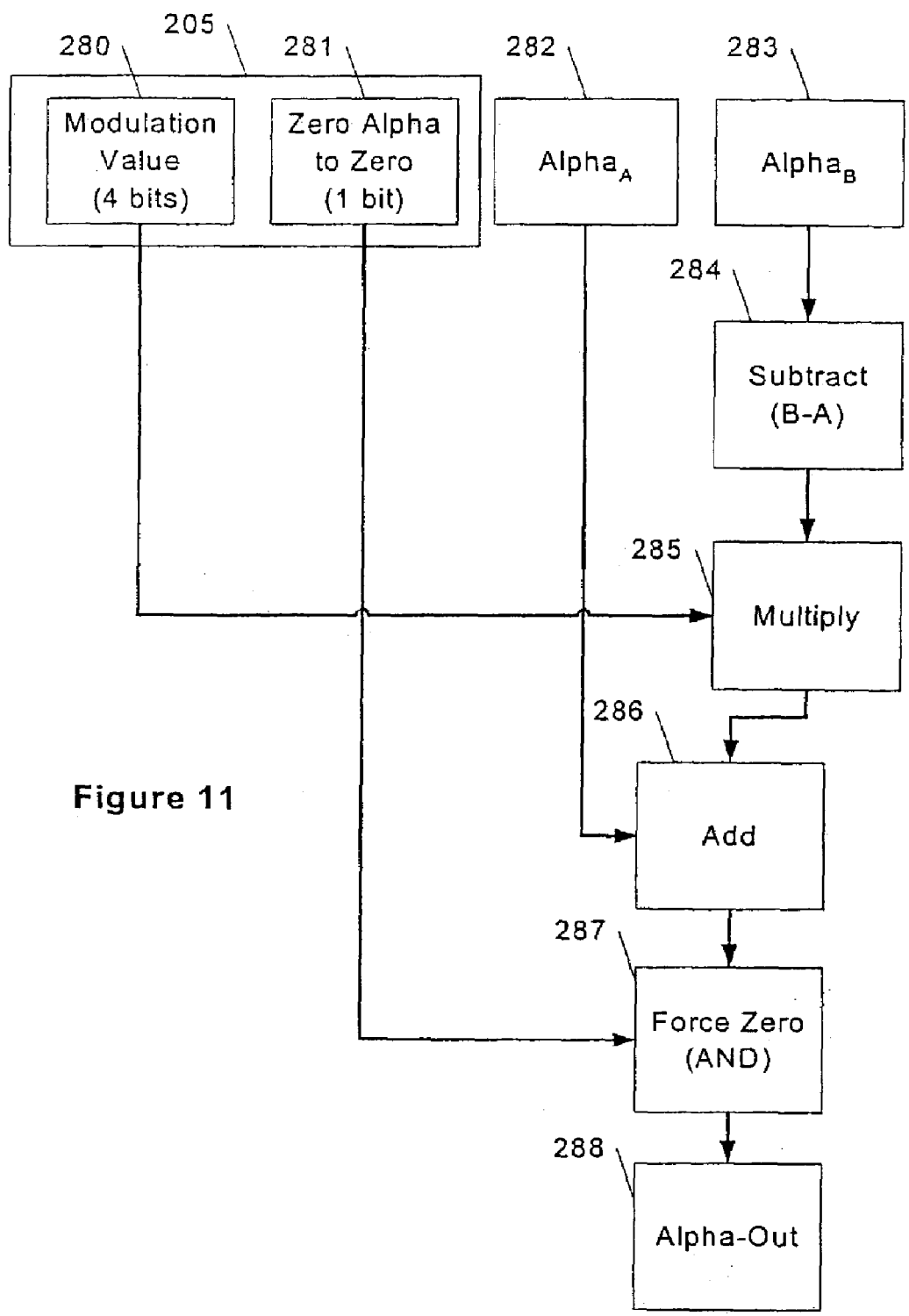
Figure 12:
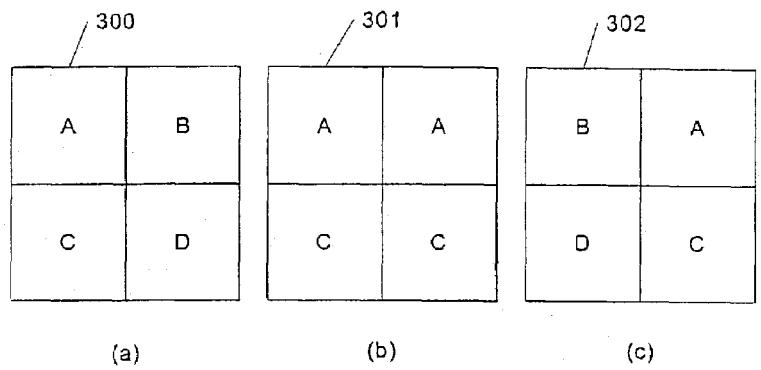
Figure 13:
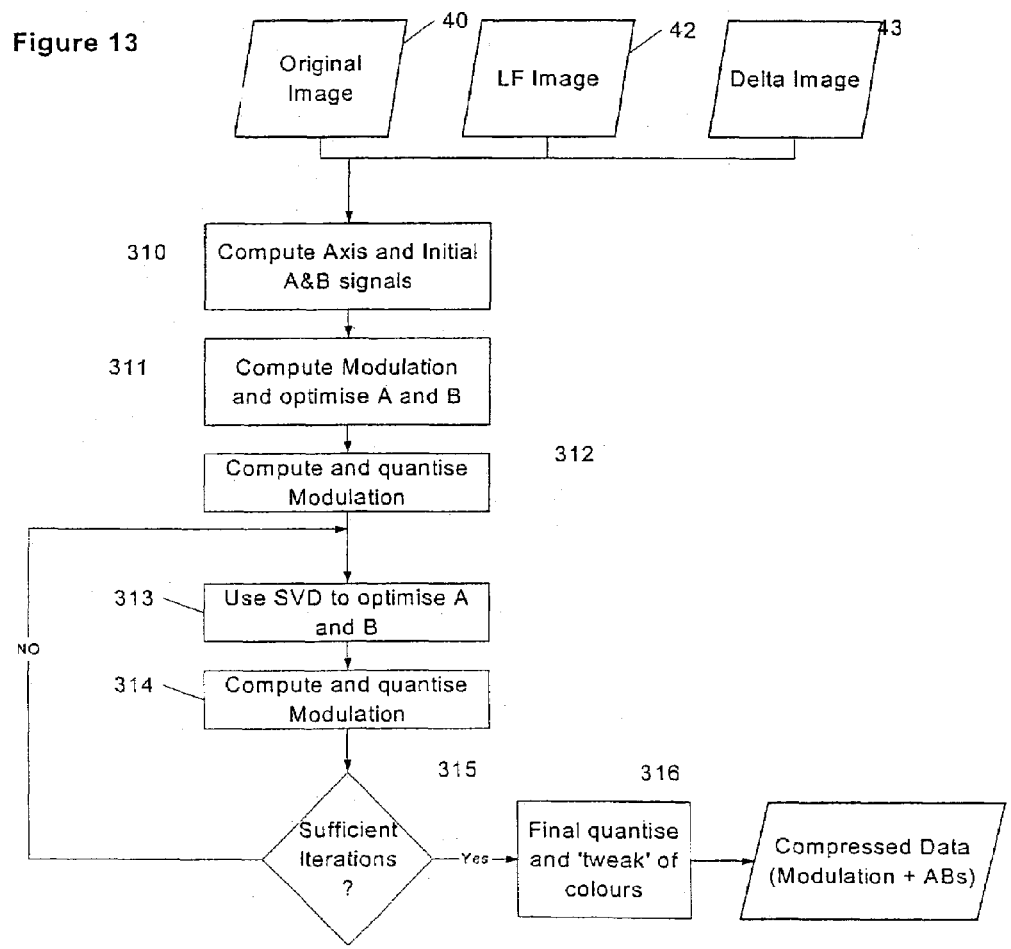
Figure 14:
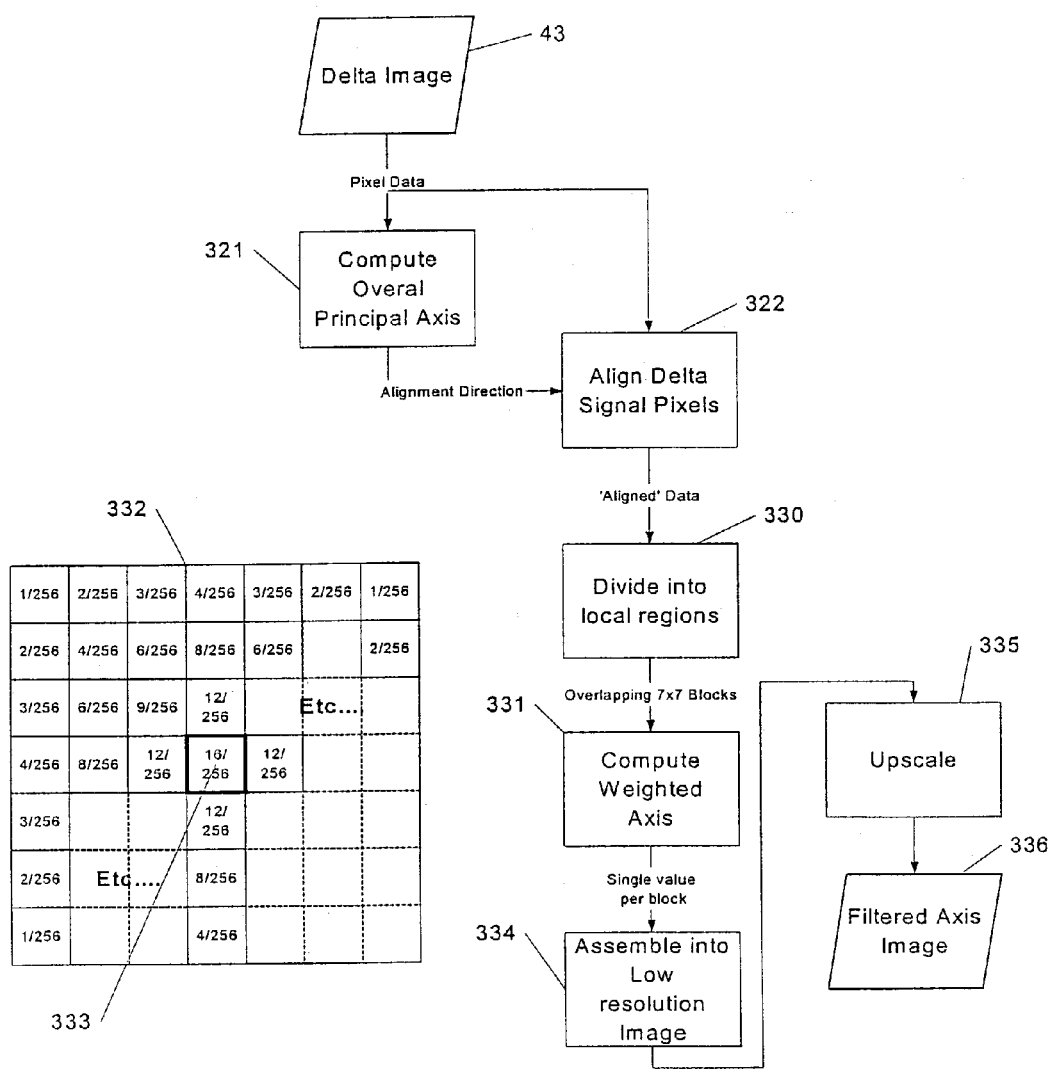
Figure 15:
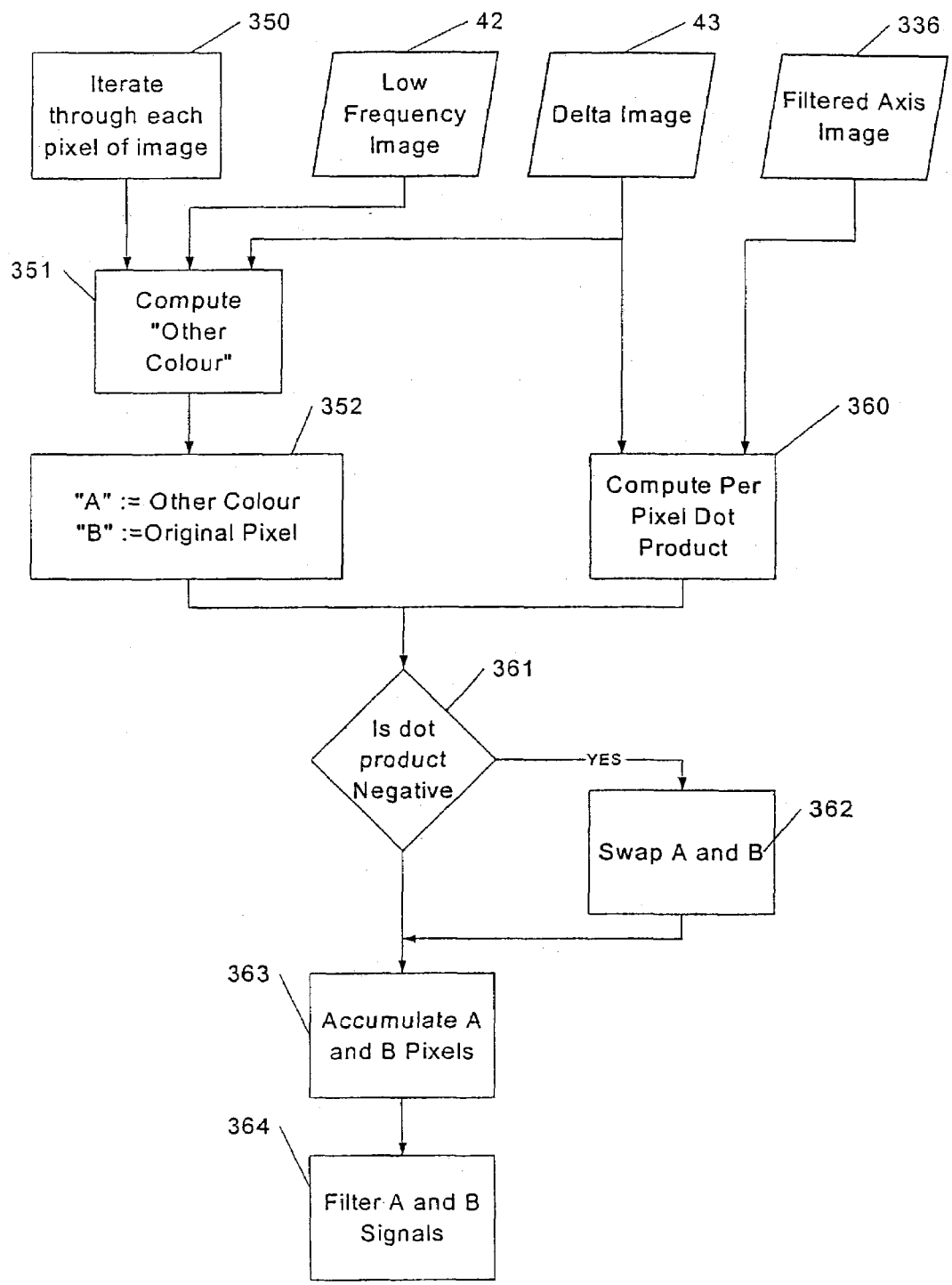
Figure 16:
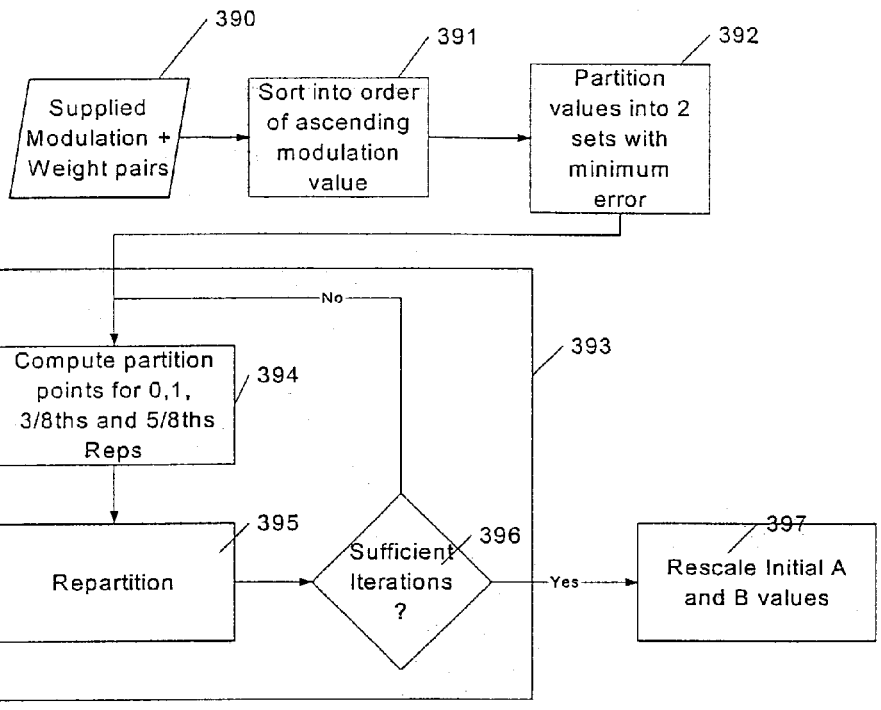
Figure 17:
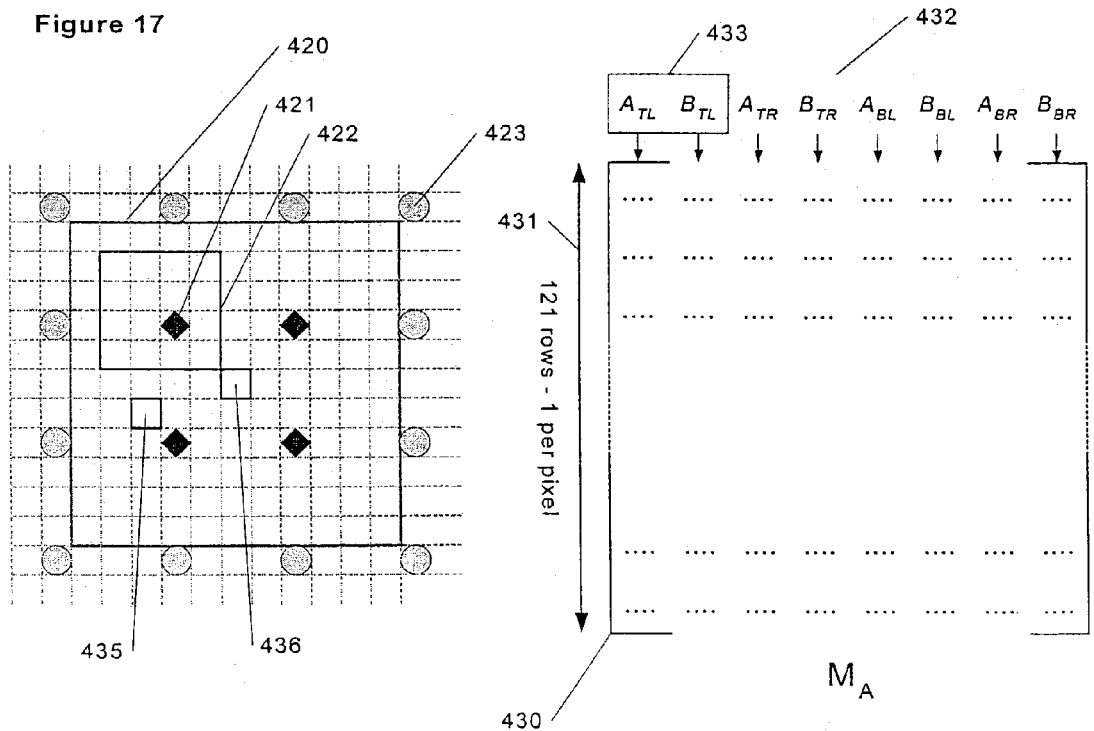
Figure 18:
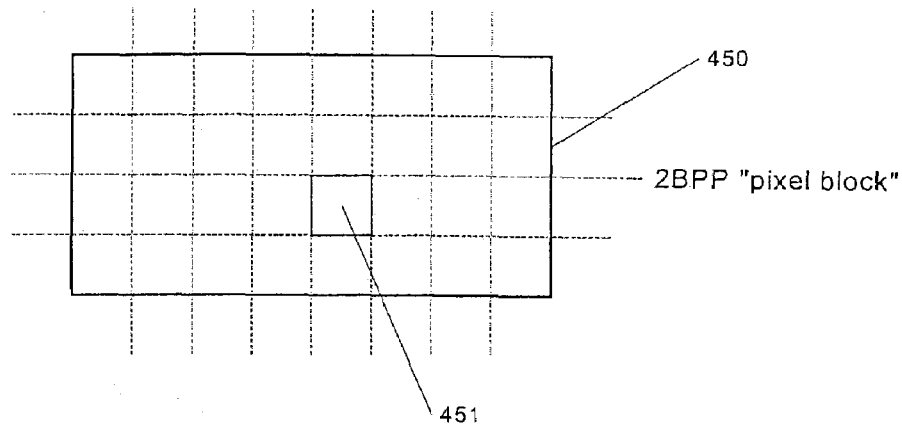
Figure 19:
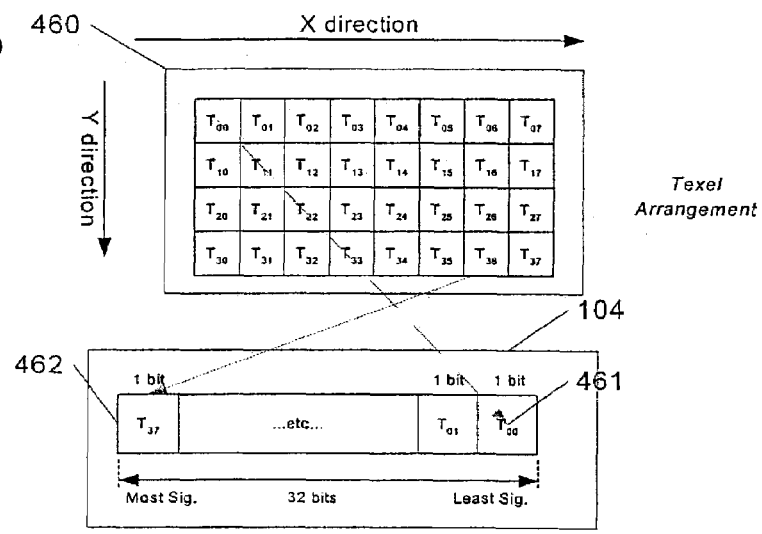
Figure 20:
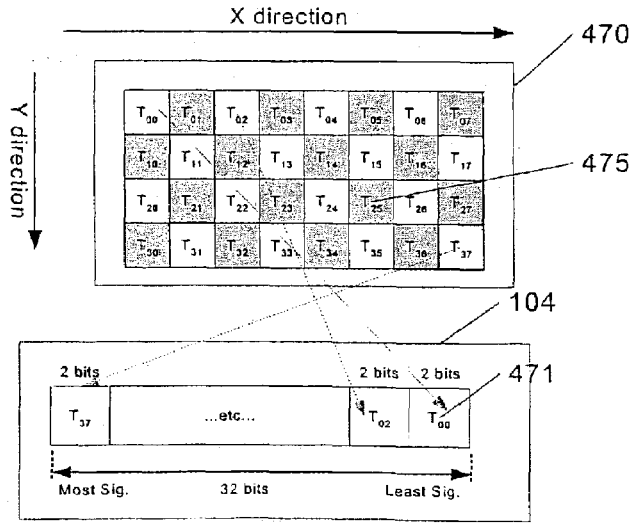
Figure 21A:
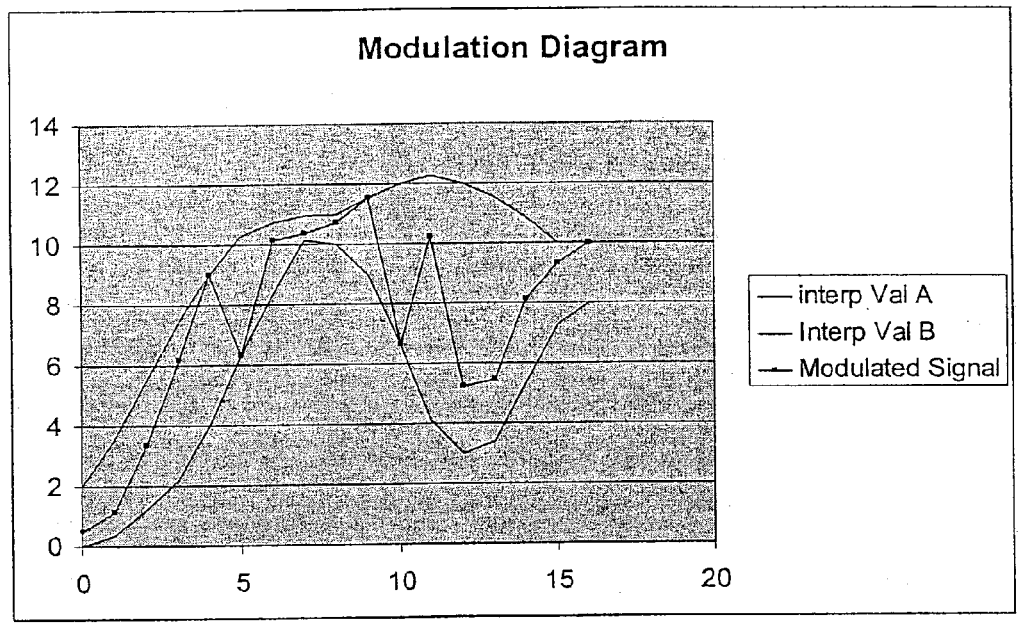
Figure 21B:
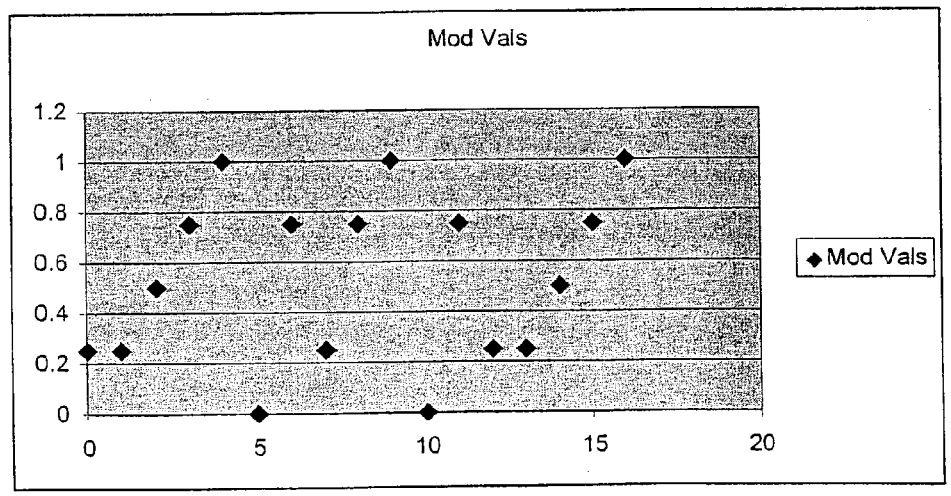

FIG. 10 describes the optimised hardware for parallel bilinear upscale;

FIG. 11 is a block diagram of the hardware that modulates the A and B signals;

FIG. 12 illustrates the swap modes needed to implement texture repetition modes;

FIG. 13 is an overview of the compression process;

FIG. 14 is the 'axis image' calculation step of the compression process;

FIG. 15 is a block diagram of the steps to compute the initial A and B in the compression process;

FIG. 16 is the initial optimisation of the modulation and A and B values in the compression process;

FIG. 17 illustrates a typical region optimised by the SVD step with a representation of the input matrix;

FIG. 18 shows the block arrangement for the 2 BPP format;

FIG. 19 shows one of the modulation modes used in the 2 BPP format;

FIG. 20 shows the other modulation mode of the 2 BPP format;

FIG. 21a shows the application of a plurality of modulation values to two sets of interpolated low resolution data; and FIG. 21b shows the modulation values used in FIG. 21a.

DETAILED OF PREFERRED EMBODIMENTS OF THE INVENTION

There are two preferred embodiments of the invention: The first stores the texture at the rate of 4 bits per pixel (bpp or BPP) while the second offers the higher compression of 2 bits per pixel albeit at lower image quality. The 4 bpp variant will be presented first, beginning with the format of the stored data, followed by the decompression process, and finally by a compression algorithm.

4 BPP Data Format

Figure 5:
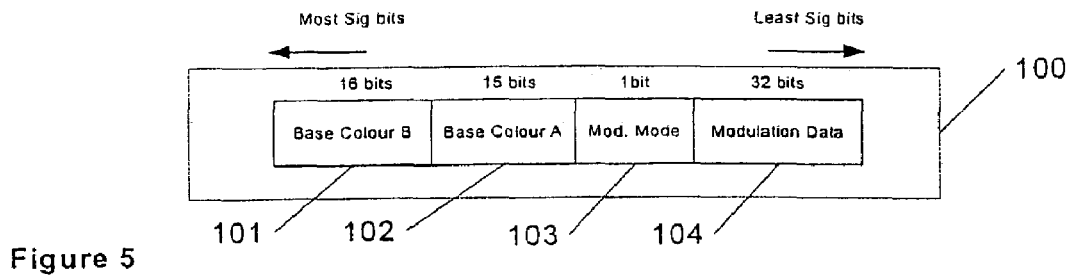
FIG. 5 shows the format of the compressed texture data blocks.

In this embodiment, the A and B low frequency signals are produced by bilinearly up scaling lower resolution images which are stored at ¼×¼ the resolution of the final texture map. Although it is possible to store the A' and B' data and the pixel modulation data separately, in the preferred embodiment they are arranged in blocks with an amalgam of local A' and B' data with the modulation information of the block. Each block in the preferred embodiment requires 64 bits of storage, the format of which is shown in FIG. 5.

Each block of data, '100', consists of four main fields of information, with these being: a 16 bit field representing the local 'colour B' signal information, '101', a 15 bit 'colour A' field, '102', a single bit modulation mode flag, '103', and 32 bits of modulation data, '104'.

Each of the colour A and colour B fields can be independently interpreted as representing either a fully opaque colour, '110', or one with a variable level of translucency '111'. A single bit flag, '112', inside each of the 'colour A' and 'colour B' fields determines the mode. In the fully opaque mode the flag, is set to "1", while it is set to "0" for the translucent mode.

In the opaque mode, for both colour A and colour B, the red channel, '113', and the green channel, '114' are both encoded by five bits. For the B colour data field, the blue channel, '115', is also represented by five bits, but for space reasons, the field is reduced to four bits for colour A. Being opaque, there is no requirement to explicitly encode data for the alpha channel which is assumed to set to the maximum value, which for reasons to be presented later, is a four bit value consisting entirely of 1s.

In the translucent mode, '111', the colour precision is reduced to allow room to store an explicit alpha value, '116', which occupies three bits. For both the A' and B' data signals, the red and green channels, '117' and '118' respectively, use four bits each. For the case of a translucent B' colour, the blue channel, '119' is also stored with four bits of precision, but is reduced to three bits for the A' colour, again for space reasons.

These colour channels can be converted back to the 'standard' 32 bit ARGB colour data signal, with eight bits per channel. A commonly used method in the art involves appending sufficient numbers of the more significant bits of the low precision numbers to generate a full complement of 8 bits. For example, a 5 bit channel value is often converted to the equivalent 8 bit value by making the original 5 bits the 5 most significant bits of the 8 bit value and then copying the 3 most significant bits and using these as the 3 least significant bits of the result. For reasons of hardware economy, the following variation, expressed in "C" code, is used instead:

```
#define R_OFF (0)
#define G_OFF (1)
#define B_OFF (2)
#define A_OFF (3)
void ConvertColour (const int ColourIn[4],
        const int OpaqueFlag,
            const int IsColourA,
                int ColourOut[4])
{
    // Intermediate format (5,5,5,4) format
    // This is important later in the document.
    int R5, G5, B5, A4;
    if (OpaqueFlag==1)
    {
        A4 = 0xF;
        R5 = ColourIn [R_OFF];
        G5 = ColourIn [G_OFF];
        if (IsColourA)
        {
            B5 = (ColourIn [B_OFF] << 1) |
```

-continued

```
            (ColourIn [B_OFF] >> 4);
        }
        else
        {
            B5 = ColourIn [B_OFF];
        }
    }
    else
    {
        A4 = ColourIn [A_OFF] << 1; //append 0
        R5 = (ColourIn [R_OFF] << 1) | (ColourIn [R_OFF]
>> 4);
        G5 = (ColourIn [G_OFF] << 1) | (ColourIn [G_OFF]
>> 4);
        if (IsColourA)
        {
            //convert 3 to 5 bits
            B5 = (ColourIn [B_OFF] << 2) |
                 (ColourIn [B_OFF] >> 1);
        }
        else
        {
            B5 = (ColourIn [B_OFF] << 1) |
                 (ColourIn [B_OFF] >> 4);
        }
    }
    // convert from 4 and 5 bits to 8 bits
    ColourOut [R_OFF] = (R5 << 3) | (R5 >> 2);
    ColourOut [G_OFF] = (G5 << 3) | (G5 >> 2);
    ColourOut [B_OFF] = (B5 << 3) | (B5 >> 2);
    ColourOut [A_OFF] = (A4 << 4) | A4;
}
```

Figure 6:
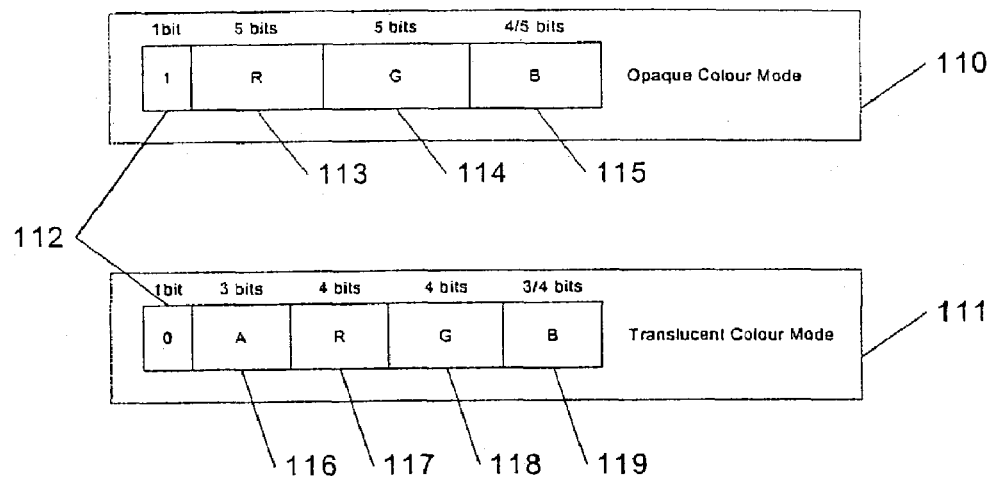
FIG. 6 shows the layout of modulation information in the 4 BPP blocks.
Figure 6:
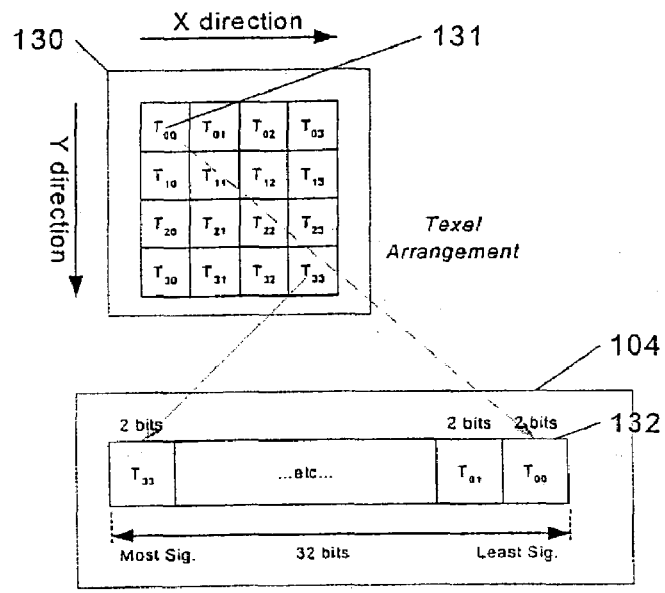

With reference to FIG. 6, the modulation data, '104', encodes the modulation information for a 4×4 block of pixels, '130'. Each pixel value is encoded using exactly two bits, with the top left pixel value, '131' being stored in the least significant position, '132'. Subsequent pixels are stored in row order, from left to right within each row, in increasing order of bit significance, with the pixel at the bottom right of the block being stored in the most significant two bits.

The modulation mode flag, '103', is used to determine how to interpret the two bit modulation values. If this flag is zero, then the two bit patterns are interpreted as:

DECODE TABLE 0

| Bit Pattern | Modulation Value |
|---|---|
| 00 | $0/8^{ths}$ |
| 01 | $3/8^{ths}$ |
| 10 | $5/8^{ths}$ |
| 11 | $8/8^{ths}$ |

The reason for this choice is twofold. Firstly, the distribution of modulation values generally follows the shape of a normal distribution centred on ½, and so it is advantageous to bias the distribution slightly toward the centre. Secondly, the numerators are small and so the blending operations are inexpensive to implement in hardware.

If the flag, '103', is set to 1, then a form of punch-through alpha texturing is enabled for the block of pixels. The modulation values are then interpreted as:

DECODE TABLE 1

| Bit Pattern | Modulation Value | Special Alpha Action |
|---|---|---|
| 00 | $0/8^{ths}$ | — |
| 01 | $4/8^{ths}$ | — |

DECODE TABLE 1-continued

| Bit Pattern | Modulation Value | Special Alpha Action |
|---|---|---|
| 10 | $4/8^{ths}$ | Force Alpha to Zero |
| 11 | $8/8^{ths}$ | — |

The 00, 01, and 11, codes behave in the same way as the other modulation mode except for the slightly different modulation value for 01. With the 10 code, the red, green, and blue colour component values are computed in the same way but the alpha value of the final pixel is forced to be zero irrespective of the alpha values in the up-scaled A and B low resolution signals.

The 64 bit blocks for an entire texture may be arranged in memory in the standard row order, i.e. all of the blocks of the first row arranged from left to right, followed by the subsequent rows. In the preferred embodiment, however, these blocks are stored in an address bit interleaved order. This technique is described in our U.S. Pat. No. 6,313,846 with regard to pixel addresses but can just as easily be applied to the arrangement of blocks. This arrangement has major implementation efficiency benefits such as reduction of memory page breaks and the simplification of data cache design.

4 BPP Decompression Method and Apparatus

Figure 1:
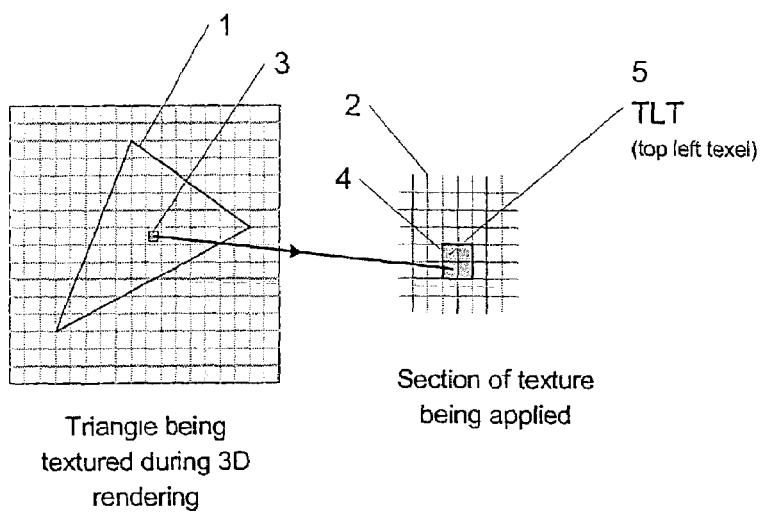
FIG. 1 is a representation of the application of a texture to a surface using bilinear filtering.
Figure 2:
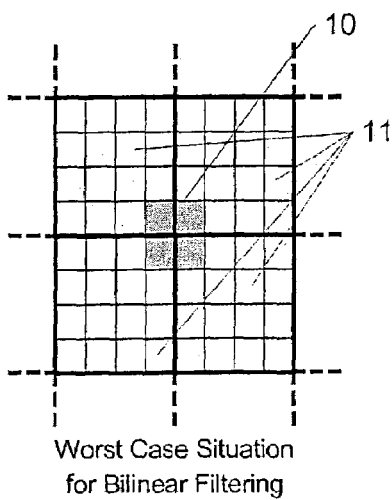
FIG. 2 illustrates the worst-case situation for bilinear filtering with S3TC.
Figure 3:
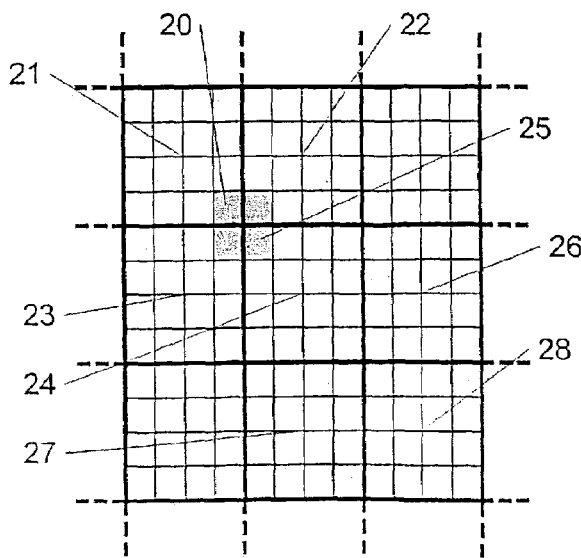
FIG. 3 illustrates the worst-case situation with bilinear filtering of "Color Distribution" texture compression.
Figure 4A:
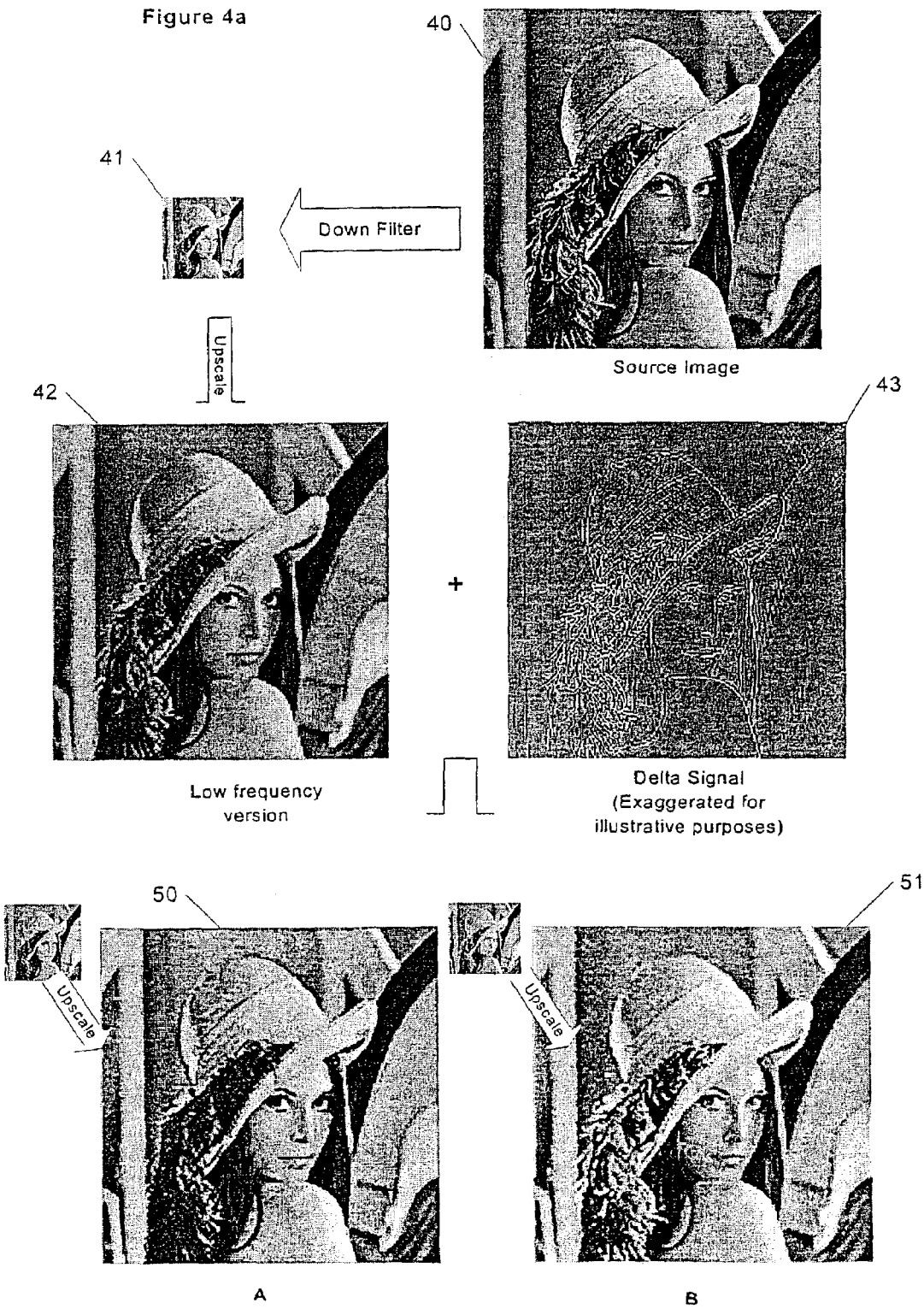
FIG. 4a shows steps involved in low pass filtering an image and computing the delta signal.
Figure 4B:
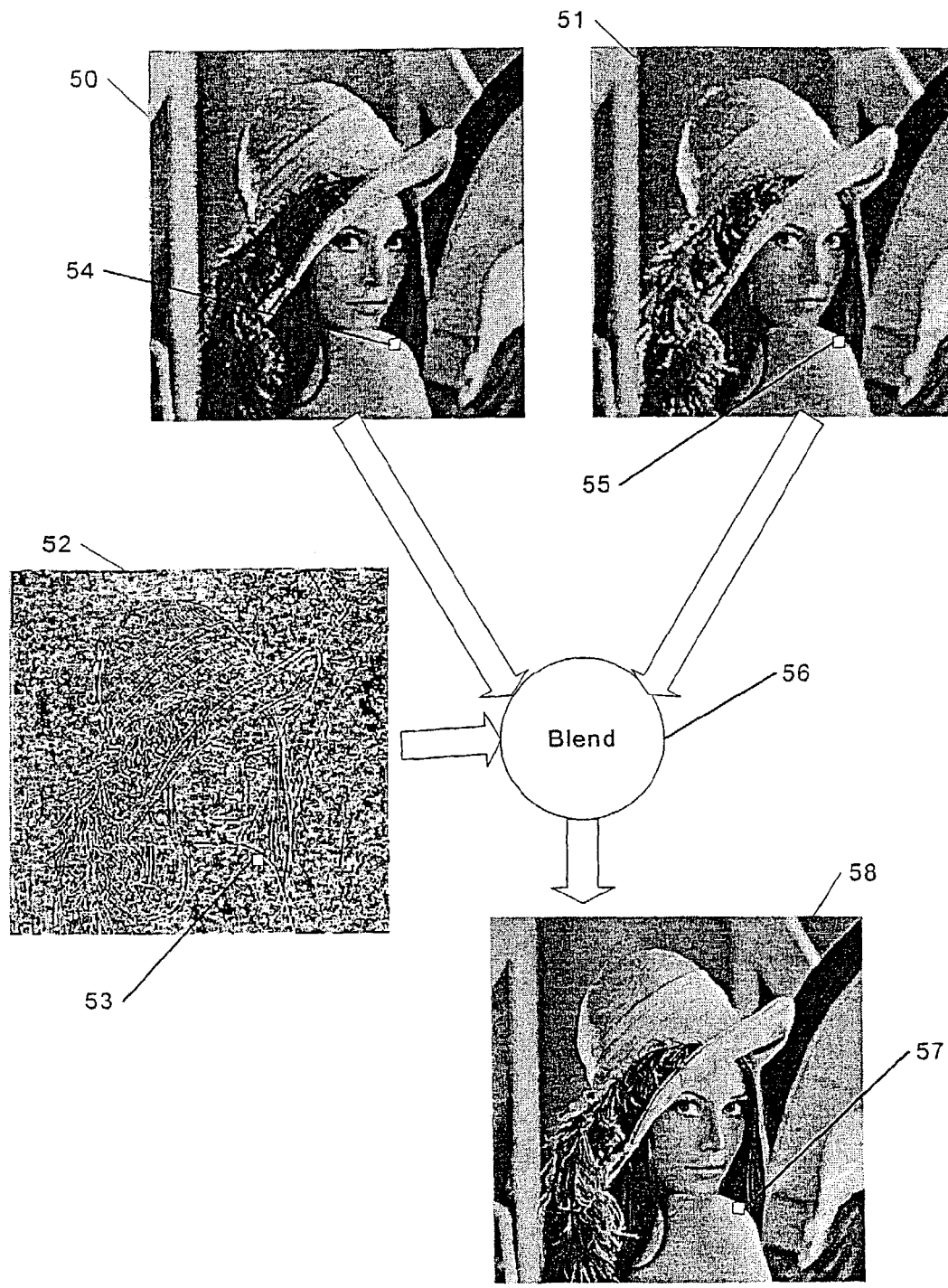
FIG. 4b shows the overall texture decompression process of the invention.
Figure 4C:
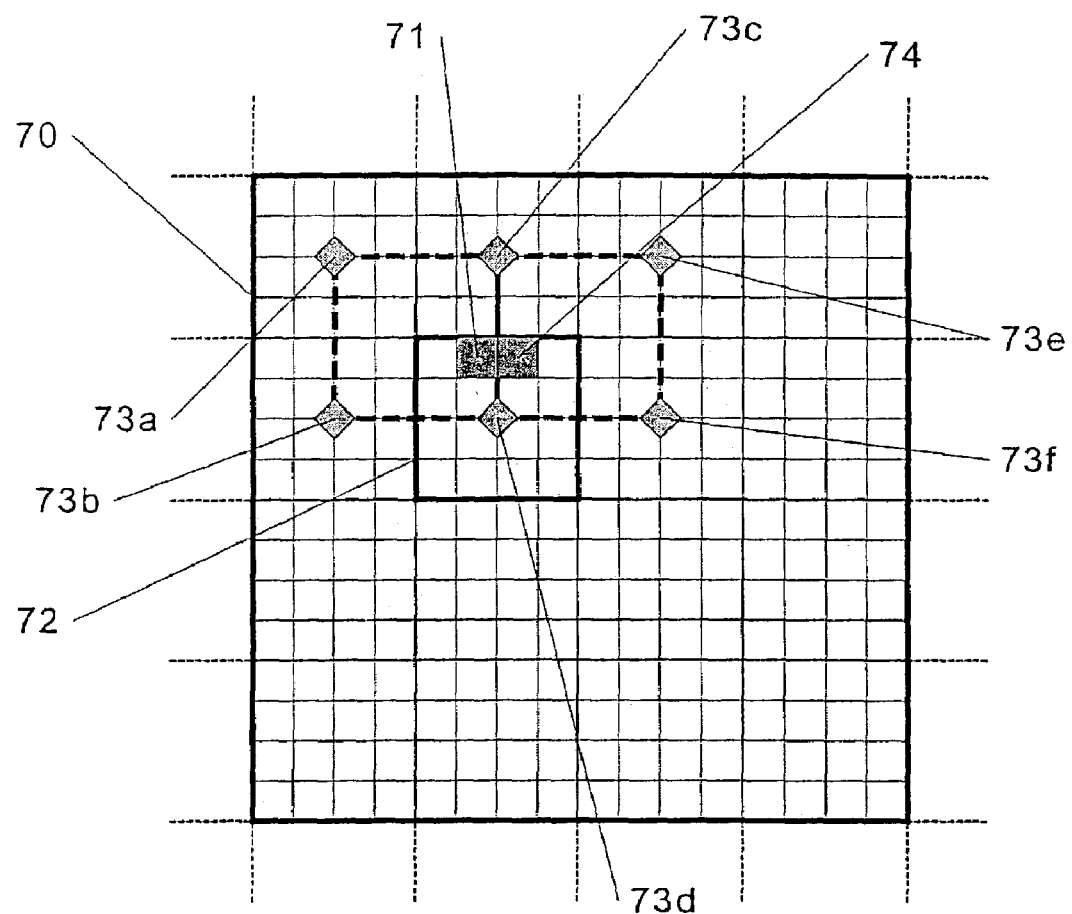
FIG. 4c is a schematic showing A and/or B values out of phase with the modulation data.
Figure 7:
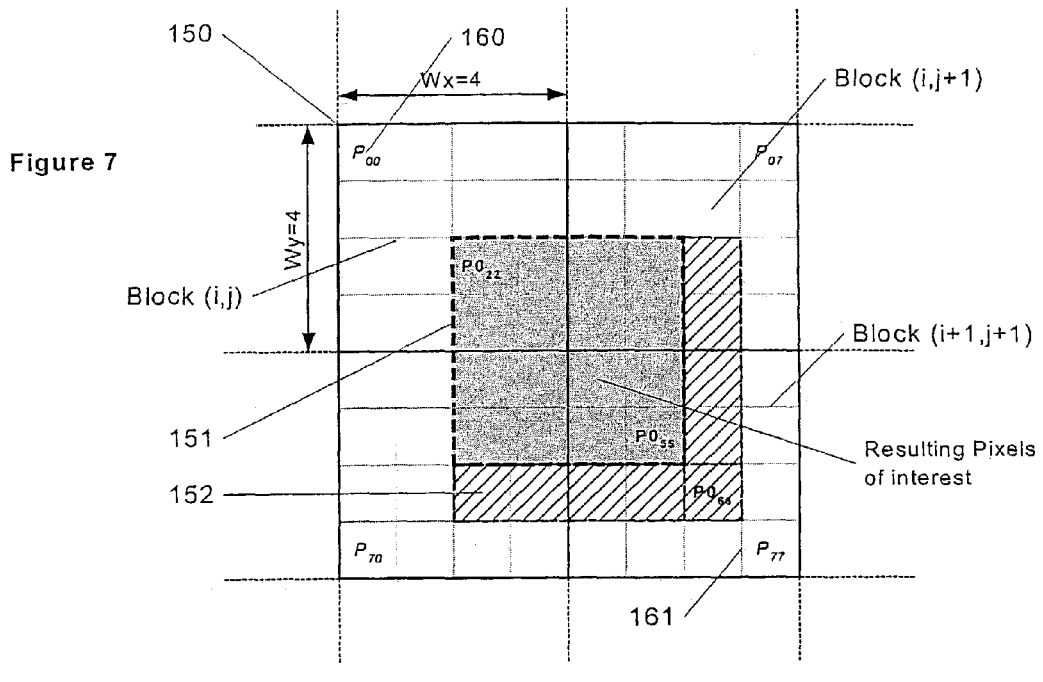
FIG. 7 illustrates the block data needed to decompress a particular set of texels.

In the preferred embodiment, the invention is optimised for decompressing groups of four pixels arranged for bilinear texture filtering. For the reasons described previously with regard to FIG. 4c, it is also optimised for the AB signals to be 'out of phase' with the modulation storage. With reference to FIG. 7, it can be noted that any set of 2×2 texels, needed for a bilinear texture filtering operation, can uniquely determine a particular set of four, 4×4 pixel blocks, '150', also arranged in a 2×2 array. This can be seen by considering the top left texel (or TLT) of the 2×2 arrangement, as shown by '5' in FIG. 1. This texel uniquely determines a unique 4×4 pixel region in the image, as illustrated by the uniform grey region, '151' . The remaining three texels will then fall somewhere within the union of the grey region, '151', and the cross-hatched region, '152'.

Note that to avoid complications at the boundaries of the texture, the 'blocks' can be assumed to repeat indefinitely. This is a slightly different issue to that of the texture 'wrap modes' that those skilled in the art will be familiar with, and that aspect will be described later.

The block coordinates of the top left block in the group can be determined directly from the coordinates of the TLT. Assuming that texel's coordinates are (y,x), and that the texture has dimensions $Y_{size} \times X_{size}$, then the block's coordinates, (i,j), are given by:

$$i = \left\lfloor \frac{(y-2) \bmod Y_{size}}{4} \right\rfloor \quad j = \left\lfloor \frac{(x-2) \bmod X_{size}}{4} \right\rfloor$$

In the preferred embodiment, the dimensions of the textures are restricted to be powers of two, which makes the above calculations inexpensive to implement in computer hardware as would be appreciated by anyone skilled in the art.

As the other blocks in the group are immediate neighbours, their coordinates can be determined by simple additions, i.e., (i,j+1), (i=1,j), and (i+1,j+1), taking care to 'wrap around' (i.e. assign to zero) any coordinate value that goes past its respective boundary of the texture. In the preferred embodiment, it is assumed that the original source texture is designed to repeat or tile. In such a texture, the left and right edges are 'similar', as are the top and bottom edges. This assumption simplifies the hardware required as, apart from the wrapping of block addresses at the right and bottom of the image, no other special processing is required. In an alternative embodiment, additional signals can be generated to optionally indicate that a boundary (i.e. the left-right, and/or top-bottom) has been crossed. These signals would instruct the bilinear up-scale hardware, to be described, to locally repeat the representative values within their respective blocks.

In decompressing the four requested texels, we can now restrict our consideration to just the four corresponding pixel blocks.

The TLT must now be located relative to the pixels of the block group. Numbering the pixels in the region from the (y=0,x=0) texel at the top left, '160', in row order to the bottom right pixel (7,7), '161', the local position of the TLT can be found by taking the two least significant bits from each of the y and x values of its coordinates and mapping them via the following table.

| Global Coord LSBs | Equivalent Local Coord |
|---|---|
| 00 | 100 (i.e. 4) |
| 01 | 101 (5) |
| 10 | 010 (2) |
| 11 | 011 (3) |

This table is mainly for illustrative purposes and this operation, although trivial, i.e. a single bit "not" operation, is not actually needed in the hardware.

Figure 8:
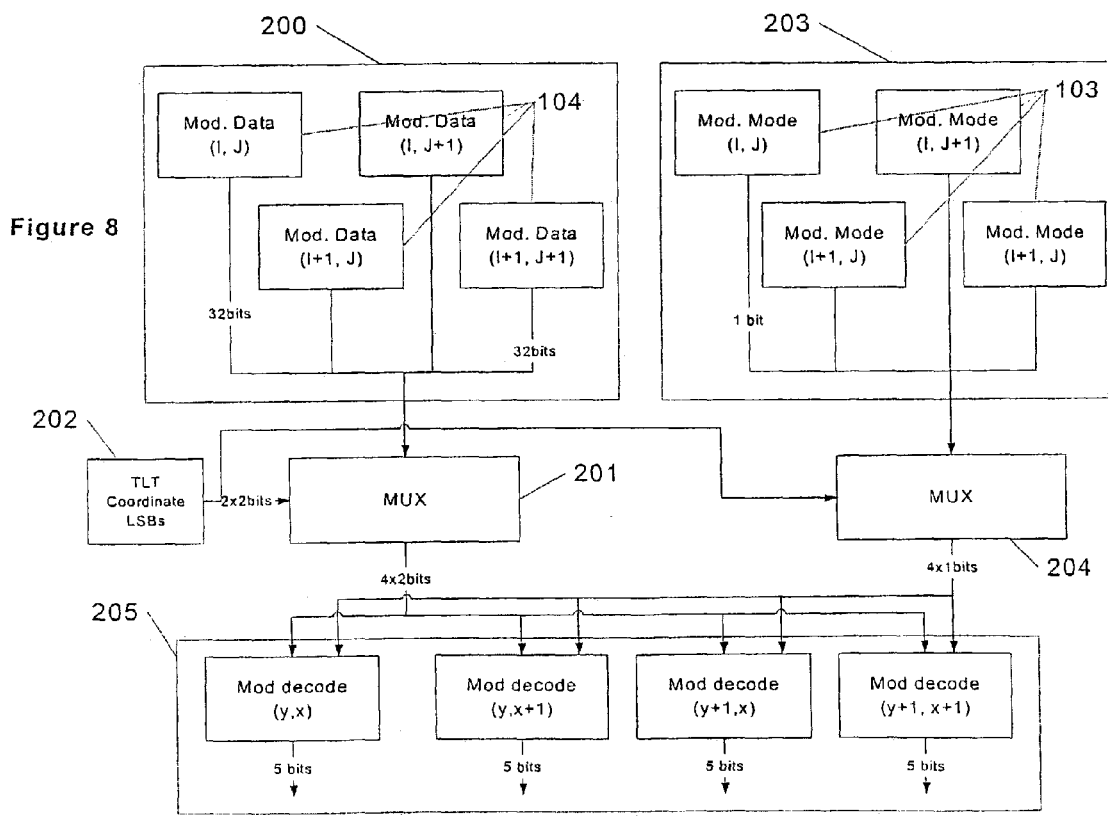
FIG. 8 is a block diagram illustrating the selection and interpretation of modulation information.

The local pixel coordinate values can then be used to produce the required modulation information. This is shown in FIG. 8. From the identified four pixel blocks, {(i,j),(i,j+1),(i+1,j),(i+1,j+1)} four corresponding modulation fields, '104', are grouped, '200', and fed into a multiplexer, '201'. In response to the two pairs of least significant bits of the TLT coordinates, '202', the multiplexer outputs the four pairs of bits corresponding to the four bilinear texels' modulation encodings.

It should be appreciated that although each modulation field, '104', stores 32 bits, not all of these need be fed to the multiplexer, '201'. With reference to FIG. 7, we can see that only four pixels of block (i,j) fall within the region of interest, i.e. the union of regions '151' and '152', and so only eight of these 32 bits need be supplied to the multiplexer.

Similarly, the set '203' of the four modulation mode flags, '103', corresponding to the four blocks are also supplied to a multiplexer unit, '204', which again in response to the TLT coordinates, '202', outputs four single bit flags describing the required modulation modes of the four texels.

Finally, the output of multiplexers '201' and '204' are grouped by texel, and each of the four sets of three bits is supplied to one of four modulation decoding units, '205', corresponding to the four texels, (y,x),(y,x+1),(y+1,x), and (y+1,x+1). Each decoding unit implements the previously described decode tables 0 & 1, and outputs 5 bits. Four of these five bits represent the numerator value from the decode tables, i.e. one of 0, 3, 4, 5, or 8, while the remaining bit indicates if the alpha value of the texel should be forced to zero.

Figure 9:
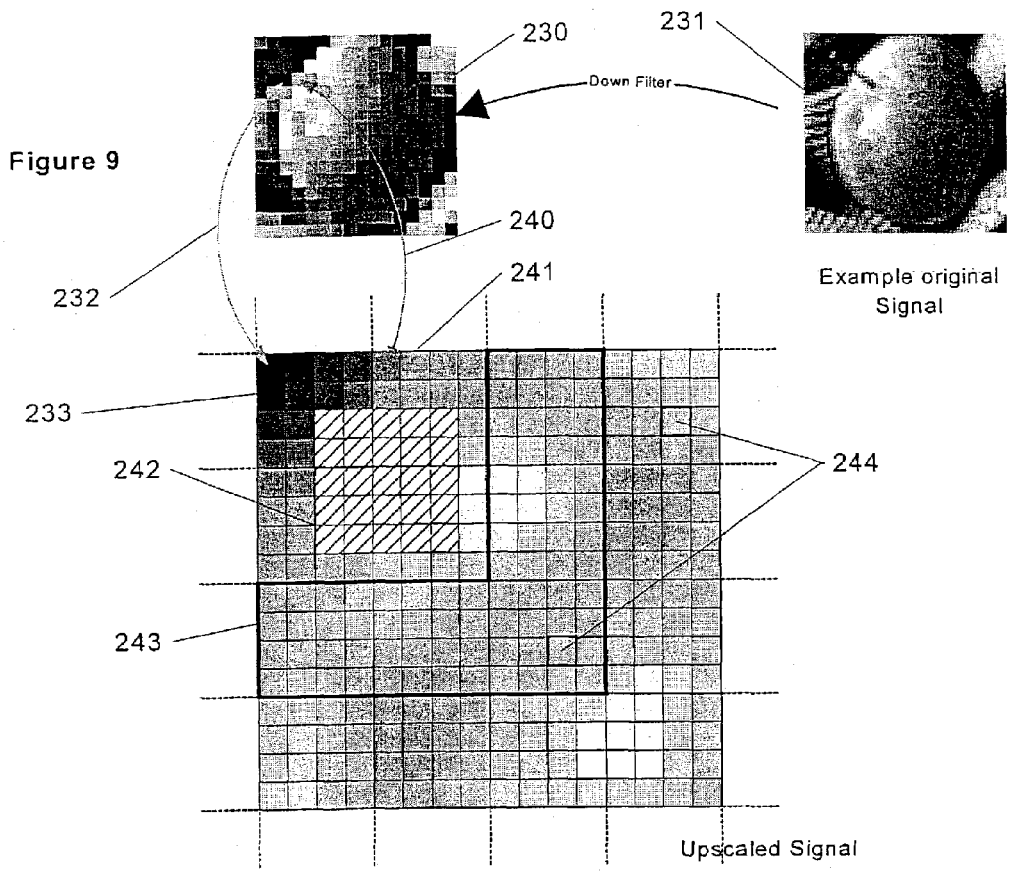
FIG. 9 illustrates a naive bilinear upscale.

The A and B colour signals must also be up-scaled to produce interpolated values for the four texels of the bilinear block. The manner in which this up-scaling is performed is important for efficiency reasons, and the 'obvious' choices are not the best. For example if one uses a 'standard' linear wavelet filter (e.g. see "Building your own Wavelets at Home", Sweldens and Shroeder, Technical Report 1995:5, Industrial Mathematics Initiative, Department of Mathematics, University of South Carolina) to produce the low frequency terms, the representative colours are 'centred' on the top left pixel of each block. This is illustrated in FIG. 9. The low-resolution data, '230', has been produced from the original image, '231'. An element of data, '232' from the low-resolution image would correspond to the top left pixel of the 4×4 pixel block '233'. Similarly, another '240', would correspond to the top left pixel of block '241'. All pixels other than the top left of each block are obtained by bilinear interpolation from the top left pixels.

Although this produces reasonably results with regards to quality (with,the possible exception of the imbalance at the edges of the image as mentioned earlier), it has efficiency problems. As described earlier with regard to FIG. 4c we desire that the representative A and B values be out of phase with the modulation data. To this end, the region of interest from FIG. 7, i.e. '151' union '152', as shown in the cross-hatched area, '242', in FIG. 9, has been defined to overlap modulation data blocks. To generate all of the texels in this region, not only are the representative colours of the four containing blocks required, but also those of an additional five blocks, as indicated by '243'.

Instead, the invention uses a variation of the above in which the representative colours are oriented on the texel immediately below and to the right of the centre of each block. Two such texels are indicated by '244'. Such texels will be called Block Representative Texels or BRTs, as they indicate the 'location' of the representatives. This scheme guarantees that to generate all the pixels in the region of interest, '242', only the representative colours from the four containing blocks are ever required. (This variant can be implemented by applying the standard linear wavelet to a shifted image).

Using the local pixel coordinate scheme described in FIG. 7, the colour of the up-scaled signal, i.e. either that of signal A or B, at any pixel in the region of interest, '151' union '152', can be given by the following bilinear equation:

$$u = (X-2)/4 \ldots \text{thus } u \in \left\{0, \frac{1}{4}, \frac{2}{4}, \frac{3}{4}, 1\right\}$$

$$v = (Y-2)/4 \ldots \text{thus } v \in \left\{0, \frac{1}{4}, \frac{2}{4}, \frac{3}{4}, 1\right\}$$

$$\overline{C}_0 = \overline{L}_{i,j} + u \cdot (\overline{L}_{i,j+1} - \overline{L}_{i,j})$$

$$\overline{C}_1 = \overline{L}_{i+1,j} + u \cdot (\overline{L}_{i+1,j+1} - \overline{L}_{i+1,j})$$

$$\overline{U}_{YX} = \overline{C}_0 + v \cdot (\overline{C}_1 - \overline{C}_0)$$

where
(Y,X) is the coordinate of the pixel relative to the four 4×4 blocks,
$\overline{L}_{\alpha\beta}$ the set of low frequency representative colour (vectors) for the four blocks, i.e. either the A or B values, and
$\overline{U}_{YX}$ is the resulting up scaled colour (vector) for the pixel.

Note that these equations must be evaluated for each of the four texels. Further note that in the above, the set of $\overline{L}_{\alpha\beta}$ colours refer to the 32 bit colour equivalents of the stored values as described earlier.

The decompression process could implement the above equations as presented, but the inventor has appreciated two independent optimisations. The first is a means of performing the interpolation almost directly on the low precision values stored in the data structure and then subsequently converting these interpolated results to the full 32 bit precision. The second and more important innovation is a means of very efficiently generating all four up-scaled pixels in parallel. This method is related to a means of generating a 3D curved surface using binary subdivision.

A combination of these two methods is used in the preferred embodiment and will now be explained with regard to FIG. 10. Only the red channel is shown, but the processing for the blue and green channels is identical. The minor differences for the alpha channel, which has one bit less precision throughout, will be obvious to one skilled in the art. Similarly, only the 'A' signal will be described, but processing for the 'B' signal is almost identical. In the following preferred embodiment description, it should be notated that only one instance of the angle calculation hardware is required as this operation, is identical for all the colour channels contained in both the A and B signals.

Each of the four red components from the four blocks' A representatives is supplied at 5 bits precision, '250'. In the situation where a particular colour has been marked as translucent (via flag '112'), the stored four bit value is first converted to 5 bit precision as described earlier in the document. From the two least significant bits of the x and y coordinates of the TLT, the more significant bits from x and y are extracted, '251', and passed to an "XY to angle" unit, '252'. This unit examines the two bits and identifies an angle of rotation which is one of 0, 90, 180, or 270 degrees. This angle, called angle 1, is encoded as 2 bits and is passed to the rotation unit, '253'. The colour representatives can be considered as lying at the corners of a square—the rotation unit merely 'rotates' the square according to the input angle. The corners of the square, after rotation, are called, in row order, left to right, P, Q, R, and S.

The output of the first rotation unit is then passed to a bilinear unit, '254', which computes the average of P and Q (av PQ), the average of P and R (av PR), and the average of all four input values (av PQRS) and outputs P, av PQ, Av PR and AV PQRS. Note that the output values will require more fractional precision.

The least significant bit of each of the x and y coordinates of the TLT, '260', is supplied to a second angle calculation unit, '261', whose functionality is identical to that of '252'. The computed angle is called Angle 2. In unit '262', Angle 1 is subtrac#ted from Angle 2, "modulo 360 degrees", to produce a difference which is supplied to a second rotation unit, '263'. This again rotates the four input component values and outputs the results, P1, Q1, R1, S1, to a second bilinear unit, '264'. This unit behaves in the same way as '254' except that it will be operating at slightly higher precision due to increased accuracy of the input bits.

Finally, angle 2 is negated "modulo 360" in unit '270', and the output fed to a final rotation unit '271'. The output of this, '272', is an intermediate form of the red components of the upscaled A signal which now need to be converted to their equivalent 8 bit format.

The "XY to angle" units, '252' and '261', are very simple and their functionality can be precisely described by the following 'pseudo C code' function. This can be trivially translated into VHDL for hardware implementation:

```
int XYtoAngle (input int Xbit, int Ybit)
{
    int Angle;
    if (Xbit==0 && Ybit==0)
    {
        Angle = 0; /*0 degrees*/
    }
    else if (Xbit==1 && Ybit==0)
    {
        Angle = 1; /*90 degrees*/
    }
    else if (Xbit==1 && Ybit==1)
    {
        Angle = 2; /*180 degrees*/
    }
    else
    {
        Angle = 3; /*270 degrees*/
    }
    return Angle;
}
```

The "Rotate" units, '253' '263' and '271', are also quite simple and can be implemented by a small set of multiplexers. Again, the functionality is described by "pseudo C code":

```
void RotateUnit (in int Angle,
                 in int Pin, Qin, Rin, Sin,
                 out int Pout, Qout, Rout, Sout)
{
    int P1, Q1, R1, S1;
    /*
    // if angle >=180 (i.e. 2==180 or 3==270)
    */
    if (Angle & 2)
    {
        P1 = Sin;
        Q1 = Rin;
        R1 = Qin;
        S1 = Pin;
    }
    /*Else no rotation */
    else
    {
        P1 = Pin;
        Q1 = Qin;
        R1 = Rin;
        S1 = Sin;
    }
    /*if there's a 90 degree component*/
    if (Angle & 1)
    {
        Pout = Q1;
        Qout = S1;
        Rout = P1;
        Sout = R1;
    }
    /*Else no rotation*/
    else
    {
        Pout = P1;
        Qout = Q1;
        Rout = R1;
        Sout = S1;
    }
}
```

Note that for efficiency reasons, the number of input and output bits of the multiplexer should be set to the minimum number of bits required to maintain full accuracy. For example, the rotation unit, '253' operates only 5 bit values. On the other hand, '263' would receive five 'significant' bits for 'Pin', six bits for each of 'Qin' and 'Rin', and seven 'significant' bits for 'Sin'. Each of the output values would have seven significant digits. These numbers will be apparent to one skilled in computer arithmetic on explanation of the bilinear units, '254' and '264'.

The bilinear units, '254' and '264' can be described, once again using 'pseudo C code':

```
void BilinearStep(in int Pin, Qin, Rin, Sin,
        out int Pout, avPQx2, avPRx2, avPQRSx4)
{
        int TempAvRSx2;
        Pout = Pin;
        avPQx2 = Pin + Qin;
        avPRx2 = Pin + Rin;
        TempAvRSx2 = Rin + Sin;
        avPQRSx4 = avPQx2 + TempAvRSx2;
}
```

To give all the output values the same binary fixed point, the Pout value should be 'multiplied by 4', i.e. have two zero bits appended in the least significant position, while the avPQx2 and avPRx2, need to be 'multiplied by 2', i.e. have a single zero bit appended. In hardware, this accuracy normalisation process can actually be carried out within the following rotation units, '263' and '271' respectively, thus minimising the size of the multiplexers within those units. For reasons of economy, the output precision of the '264' unit, which would otherwise be 9 bits, is truncated to 8 bits with no significant degradation to quality.

The one remaining operation for the bilinear upscaling is that of converting the intermediate channel results, '272', to the 8 bit equivalents. For the R, G, and B signals, these values currently have 8 bits precision, in "5.3" format, i.e. 5 bits representing values larger than the binary point, and 3 fractional bits. The following operation is used to convert the format:

```
int Convert5p3to8 (in int Val5p3)
{
        int out;
        out = Val5p3 + (Val5p3 >> 5);
        return out;
}
```

For the case of the alpha component, the final intermediate precision at '272' is also an 8 bit result, but is in the form "4.4". This is converted using the following:

```
int Convert4p4to8 (in int Val4p4)
{
        int out;
        out = Val4p4 + (Val4p4 >> 4);
        return out;
}
```

The last step of the decompression process is to blend the four modulation values with their respective A and B signal pixels and, where necessary, force the alpha to be zero. The hardware for one of the 4 bilinear pixels illustrating just the alpha channel is shown in FIG. 11. The five bit modulation information, '205', determined in FIG. 6, is split into the four bit modulation value, '280', and the 'force alpha to zero' flag, '281'. The eight bit alpha values, '282' and '283', corresponding to the output of the bilinear expansion of signals A and B are supplied to a subtract unit, '284', producing a signed 9 bit result. This result is multiplied, '285', by the four bit value '280', which represents a value in the range 0.1, to produce a 12 bit signed result in the format "9.3". This only has 12 bits and not 13 due to the restricted range of '280'. Finally, this is added to the 'A' value, '282' in '286', and the three fractional bits and the single sign bit are discarded to give an 8 bit result. Because of the mathematics involved, the result is guaranteed to be positive and in the range 0 to 255 inclusive. Finally, if the texel was actually marked as punch-through, indicated by the '281' flag, the computed value is forced to be zero, '287'. The result, '288' represents the alpha value for the given texel. The hardware for the red, green and blue channels is identical to that of the alpha except that there is no "force Zero" unit, '288'.

In the main graphics library standards, there is also the requirement for special behaviour for the repetition of textures. Such operations, which can be applied independently to the x and y dimensions, include repeating the texture ad-infinitum, reversing the direction on every second repeat of the texture, or simply clamping the texels to the boundary. These operations can be performed by passing a set of signals from the original pixel location calculation, with respect to the chosen repetition mode, to indicate one of three options available independently for the x and y dimensions. The options for the x direction are shown in FIG. 12. These are to not modify the output, '300', copy the left pair to the right pair, '301', or to swap the left and right pairs of output texels '302'. The options for the y dimension are analogous.

4 BPP Compression Method

Although the decompression process is relatively straightforward, that of the compression is much more involved. Returning to FIG. 4a, the compression process in the preferred embodiment begins with down filtering the original image, '40', by a factor of four in both dimensions using the modified linear wavelet transform described previously, i.e., one that 'centres' the representative values on the BRTs. The high frequency information from the wavelet transform is thrown away leaving the low frequency terms, '41'. This is then upscaled using the bilinear expansion, '42'. The difference between the low frequency signal and the original image is computed, '43'.

An overview of the remainder of the process is given in FIG. 13. In step '310', the method takes as input the original image, '40', the low frequency version. '42', and the delta image, '43', and from these signals, an 'axis' image is generated. This represents the filtered direction of maximum components of the delta signal. From this and the original and delta signals, the initial A and B signals are generated.

In step '311', modulation values for each pixel are computed from the original image and the initial A and B signals, which are then partitioned into quantised sets and used to optimise the initial A and B signals.

In step '312', the modulation values are recomputed from the updated A and B signals, and these are quantised choosing the best modulation mode for each block.

In step '313', using the chosen quantised modulation values, the A and B signals are set to the 'optimum' values by 'solving' for the minimum least squares error on over-lapping regions of pixels by using Singular Value Decomposition, SVD. This technique comes from the fields of linear algebra and numerical mathematics. A discussion of singular value decomposition is presented in "Numerical Recipes in C" by Press et al. (Cambridge University Press, ISBN 0-521-43108-5).

From the updated A and B values, new modulation values are computed and quantised, '314', using the same technique as step '312'. Step '315', repeats the '313' and '314' optimisation steps a number of times. Finally, the colours are quantised and stored, '316' although an optional step could 'tweak' the stored values slightly to attempt to get a better representation of the original image.

FIGS. 14 and 15 describe the operations performed in step '310'. With regard to the FIG. 14, the delta signal, '43', is now analysed, '321', to find the overall principal axis of the data. This type of analysis, for example as described by Wu ("Color Quantization by Dynamic Programming and Principal Analysis", Xiaolin Wu, ACM Transactions on Graphics, Vol. 11, No. 4, October 1992, pp 348–372), or Iourcha, (U.S. Pat. No. 5,956,431), first computes the covariance matrix of the input data and then finds the principal eigenvector of that matrix. The principal eigenvector then represents the major axis running through the data.

The invention uses a method that has two minor modifications from those in the art just described. The first is the minor point that, rather than being three-dimensional, the colour vectors include an alpha component thus making them and the principal axis four dimensional, and the covariance matrix 4×4. The second, and more important difference is that the delta vectors are assumed to be symmetrical about the origin. This could be achieved by using each delta value twice in the evaluation of the covariance matrix, in which the components are negated on the second use. A far cheaper method, however, is to simply assume that the averages of each component are zero. This is expressed below:

$$M_{covar} = \begin{bmatrix} C_{RR} & C_{RG} & C_{RB} & C_{RA} \\ C_{RG} & C_{GG} & C_{GB} & C_{GA} \\ C_{RB} & C_{GB} & C_{BB} & C_{BA} \\ C_{RA} & C_{GA} & C_{BA} & C_{AA} \end{bmatrix}$$

$$C_{\phi\theta} = \frac{1}{n}\sum_{i=1...n} w_i \cdot \phi_i \theta_i - \overline{\phi} \cdot \overline{\theta}$$

where $M_{covai}$ is the required covariance matrix, $R_i$, $G_i$, $B_i$, $A_i$ are the colour components for pixel i, $W_i$ is the weight, or importance, of the sample pixel (in this situation=1)

n is the number of samples, $\phi$ and $\theta$ represent a choice of (potentially the same) colour channels, and $C_{\phi\theta}$ is the covariance of $\phi$, $\theta$.

Since the compression method assumes symmetry about the origin, the averages in the above covariance equation can be assumed to be zero, simplifying the evaluation. The eigenvector of the matrix is computed and this becomes the overall axis. In the alignment step, '322', each pixel of the original delta data, '43', is compared with the overall axis by taking the dot product of that pixel and the axis. If the scalar result is negative, the delta pixel is 'flipped' by negating each component.

The 'axis aligned' delta data is then divided into overlapping, 7×7 pixel blocks, '330'. These dimensions correspond to (2.PixelBlock$_{Height}$−1).(2.PixelBlock$_{width}$−1).

Each of these overlapping blocks is centred on a BRT and represents the region directly influenced by representative colours. The principal axis for each local region is calculated, '331', using a weighted filter. The per pixel weights are shown by '332', with the centre and most significant weight, '333', aligned on the BRT. These weights correspond to the bilinear filter weights for the representative colours in that local region scaled so the sum of the weights is 1.0. All other aspects of the principal vector calculation (i.e. the creation of the covariance matrix and eigenvector calculation) are the same as before.

The resulting principal vectors are reassembled to form a low-resolution image, '334', which is a ¼ the resolution in x and y. This is then bilinearly scaled up, '335', to form the filtered axis image, '336'.

The next part of '310' is to compute initial guesses for the A and B signals. With reference to FIG. 15, the process involves stepping, '350' through each pixel of the image. From the each pixel of the image an alternative 'other' pixel is computed, '351', by selecting the corresponding pixel from the delta image, '43' and subtracting it from the low frequency signal, '42'. (Note that adding these two pixels results in the pixel from the original image). This 'other' pixel is 'temporarily' assigned to a per-pixel "A" value and the pixel from the original image is assigned to a per-pixel "B" value, '352'.

The dot product of the corresponding pixels from the delta image, '43', and the filtered axis signal, '336' is also computed, '360'. If the sign of this result, '361', is negative, then the assigned 'A' and 'B' values for the pixel are swapped, '362', otherwise they are left as they are. The individual per-pixel A and B colours are reassembled into two images, '363', and these are down scaled, '364', to produce starting A and B representatives for each block. These values are stored for later use. The values are also bilinearly scaled up to produce low frequency "Initial A" and "Initial B" signals.

The first step of '311' is to compute an initial set of modulation values for the image from the initial low frequency estimates "Initial A" and "Initial B". The following mathematics is used to obtain the modulation scalar value, m, for each pixel:

$$m = \frac{(\overline{O} - \overline{A}) \cdot (\overline{B} - \overline{A})}{(\overline{B} - \overline{A}) \cdot (\overline{B} - \overline{A})}$$

where $\overline{O}$ is the corresponding pixel (a vector) in the original texture and $\overline{A}$ & $\overline{B}$ are the corresponding pixels in the (initial) low frequency (scale up)

A and B (vector) signals.

In the event of a zero denominator, the result is assumed to be zero. The modulation values can be treated as a monochrome image.

Using this initial set of modulation values, a pass of optimising the per-block A and B representative values signals is performed. Again using the filter kernel defined by '332', the image is divided into overlapping 7×7 regions centred on the BRTs. With reference to FIG. 16, the 7×7 modulation values and associated weight pairs, '390' are sorted into ascending order of modulation value, '391'.

These sorted elements are then partitioned into 2 sets, P and Q such that, $\forall p \in P$ and $\forall q \in Q$, $p_{mod} < q_{mod}$ and where the error, E, $$E = \sum_{p \in P} p_{weight}(p_{mod} - p_{wav})^2 + \sum_{q \in Q} q_{weight}(q_{mod} - q_{wav})^2$$

is a minimum. In this equation, $$p_{wav} = \frac{\sum_{p \in P} p_{weight} \cdot p_{mod}}{\sum_{p \in P} p_{weight}} \quad q_{wav} = \frac{\sum_{q \in Q} q_{weight} \cdot q_{mod}}{\sum_{q \in Q} q_{weight}}$$

are weighted averages.

Note that finding the partitioning that gives minimum error can be computed in linear time by observing $$E_{PortionP} = \sum_{p \in P} p_{weight} \cdot (p_{mod} - p_{wav})^2$$

$$= \sum_{p \in P} p_{weight} \cdot p_{mod}^2 - \frac{\left(\sum_{p \in P} p_{weight} \cdot p_{mod}\right)^2}{\left(\sum_{p \in P} p_{weight}\right)}$$

can be updated incrementally in constant time. Thus the errors due to each partition can be quickly updated as the partition point is swept through the set of values.

Once the initial pair of partitions has been computed, the sets can be split further into four corresponding to the main four modulation quantisation levels, i.e. 0.0, ⅜, ⅝, and 1.0. For speed reasons, a simple Generalised Lloyd's Algorithm, GLA, is used, '393'.

The first step, '394', of this algorithm consists of the equivalent of computing the representative values for 0 and 1, which are simply the weighted averages, $p_{wav}$ and $q_{wav}$, and finding the 'equivalent' of the two implied the fractional representatives, which are the obvious linear blends of these two. The modulation values are now repartitioned, '395', into these new categories. Any modulation value less than $$\frac{13}{16} p_{wav} + \frac{3}{16} q_{wav}$$

is assigned to the new "0" (i.e. p) set and any greater than $$\frac{3}{16} p_{wav} + \frac{13}{16} q_{wav}$$

is assigned to the "1" (i.e. q) set. For the present, the other two sets are not needed. The $p_{wav}$ and $q_{wav}$ values corresponding to the new sets are then computed.

If a predetermined number of iterations have not yet been performed, '396', the GLA repeats steps '394' and '395'.

After sufficient operations, in step '397' the final representative values for set "0" and set "1", i.e.

$p_{wav}$ and $q_{wav}$, are used to modify the representative A and B values for this region using:

$$\overline{A}_{new} = \overline{A}_{original} + p_{wav} \cdot (\overline{B}_{original} - \overline{A}_{original})$$

$$\overline{B}_{new} = \overline{A}_{original} + q_{wav} \cdot (\overline{B}_{original} - \overline{A}_{original})$$

In step '312' the modulation values are again computed using the mathematics described for the first part of step '311'. For each 4×4 block in the image, the computed modulation values are quantised to the set of values, {0, ⅜, ⅝, 1}, and to the set {0, ½, 1}. The set of quantised levels which results in the least quantisation error, is chosen for the mode of the block. (In the case of blocks that contain punch-through pixels, however, the latter mode is automatically chosen.) The modulation values are set to their quantised levels.

In step '313' the chosen quantised modulation values are then used to recompute optimised A and B values using singular value decomposition, or SVD. This phase uses SVD to optimise an arbitrary set of, preferably neighbouring, A and B representative pairs. This is done by selecting the pixels whose compressed results are determined by the chosen set of A and B pairs and retrieving both their original pixel colours and their chosen quantised modulation values. In theory, the technique could be applied to the entire image in one single step. The SVD algorithm, however, has O($n^3$) run time, where n is the number of pixels, and so this would be very expensive. In the preferred embodiment, the optimisation is repeatedly performed on sets of four pairs of A and B values at a time, with one such set shown in FIG. 17.

The 11×11 pixel region, '420', is directly affected by the four pairs of A and B values, the positions of which are indicated by dark diamonds. The top left of these is shown by '421'. The size of this pixel region is determined by (3.PixelBlock$_{Height}$−1).(3.PixelBlock$_{width}$−1). For reference, the 4×4 pixel block containing '421' is shown by '422'. A further twelve AB pairs, as indicated by grey circles, also affect the region. One such pair is '423'. The twelve outer pairs are held constant when new optimum values for the corresponding group of four AB pairs are computed A matrix, $M_A$, shown as '430', is constructed with 121 rows and 8 columns. Each row, '431', corresponds to a unique pixel in the region, '420', and each column, '432', corresponds to the 'influence' each of the eight AB values, i.e. four pairs, has on that pixel. In the example, the values corresponding to AB pair '421' have been assigned to the first two columns, '433'. The influence of a particular value is determined by the bilinear weight associated with the pixel and the AB location, and the modulation value assigned to the pixel. For example, assume pixel '435' has an assigned quantised modulation value of $m_1$. It would have the following corresponding row in $M_A$:

$$\left[(1-m_1)\frac{3}{16}, m_1\frac{3}{16}, 0, 0, (1-m_1)\frac{9}{16}, m_1\frac{9}{16}, 0, 0\right]$$

Note that only the left AB pairs affect pixel '435', while for pixel '436' with modulation value $m_2$, the corresponding row is $$\left[(1-m_2)\frac{4}{16}, m_2\frac{4}{16}, (1-m_2)\frac{4}{16}, m_2\frac{4}{16},\right.$$

$$\left.(1-m_2)\frac{4}{16}, m_2\frac{4}{16}, (1-m_2)\frac{4}{16}, m_2\frac{4}{16}\right]$$

A second matrix, $M_B$, is also constructed which has 121 rows and 4 columns with the columns corresponding to the red, green, blue, and alpha channel. This matrix contains the pixel values of the region, '420', except that any components of the pixels that would be due to the 12 outer pairs, such as '423', are removed by subtraction.

The eight unknown optimum A and B values are represented by the 8 element column vector $\overline{X}$. To determine $\overline{X}$, we need to 'solve' the following linear expression such that the least squared error is minimised.

$$M_A.\overline{X} = M_B$$

Given this system of equations, the SVD technique will return the optimum vector $\overline{X}$. The new A and B values are extracted and replace the original values for this region. These steps are repeated for all, or some subset of, such four AB pair groups.

In step '316' the A and B colour values are quantised. An optional operation can be performed to test slight variants of the quantised levels, e.g. via a genetic algorithm, to see if improvements the overall accuracy of the compressed image can be achieved.

The final quantised A and B values, modulation values, and per-block modulation mode are now packed into the format described earlier and stored for used by the decompression system.

2 BPP Method

The 2 BPP method represents a variation on the 4 BPP scheme and so only the major differences between the two need be presented.

As shown in FIG. 18, the 'blocks' are extended to be 4×8 (Y*X) pixels in size, '450'. The position of the BRT, '451', of each block is again set to be the texel immediately below and to the right of the centre of the block. The bilinear upscale clearly is performed with an additional twofold expansion in the x direction.

As with the 4 BPP mode, each block is stored using 64 bits, each with the same four data fields, as shown in '100' in FIG. 5. Colour representation, '110' and '111', is identical to that of the 4 BPP mode. The only difference is the way in which the 32 bits of modulation data, '104', and the modulation mode flag, '103', are interpreted.

If the modulation mode flag, '103', is set to zero, then the bits are interpreted in a manner as illustrated by FIG. 19. Each of the 32 pixels' modulation values in the block, '460', is encoded using a single bit. As before, the top left pixel is stored in the least significant location, '461', and the bottom right in the most significant, '462'. A stored zero value indicates a modulation value of 0.0, and a one indicates 1.0.

If the mode flag, '103', is set to one, only every second pixel is explicitly encoded, as shown in FIG. 20. In the pixel block, '470', only the modulation value for texels that are marked as 'white' are stored, using two bits per texel. The encoding of these texels is identical to that of the first 4 BPP mode, in which the four possible modulation values when decoded are {0, ⅜, ⅝, 1}. As before, the top left pixel's modulation value is stored in the least significant 2 bits, '471', and the bottom right's value is in the most significant bits.

The remaining 'grey' texels in the chequer board pattern have their modulation values implied by the average of the immediately surrounding four 'white' texels. For example, texel $T_{2,5}$, indicated by '475', has its modulation value implied by the average of texels $T_{1,5}$, $T_{2,4}$, $T_{2,6}$ and $T_{3,5}$. 'Grey' texels on the edge of a block use the neighbouring blocks' 'white' texel modulation values.

To minimise the cost of the subsequent modulation operation, the computed average is rounded to the nearest ⅛$^{th}$ value. More precisely, if $m_a$ $m_b$ $m_c$ and $m_d$ are the 'white' modulation values surrounding a 'grey' texel, then the grey's modulation value is given by:

$$m_{grey} = \frac{\left\lfloor 2(m_a + m_b + m_c + m_d) + \frac{1}{2} \right\rfloor}{8}$$

Alternative Implementations

An alternative embodiment could store the two per-block colours as an average and a difference of the two original colours, with more bits of precision being assigned to the average and less to the difference. This system would generally work better for natural images but would be inferior for diagrams. An alternative colour space, such as YUV+alpha, could also be used to represent the per-block colours.

Another alternative could store the modulation values in a transform encoded manner, such as using DCT, hadamard transforms, or one or two wavelet passes. Some number of the less significant higher frequency terms could be discarded. Again, this approach works reasonably well with natural images but often fails with diagrams.

Although it requires additional memory accesses and evaluation cost, using a biquadratic or bicubic interpolation can improve the quality of the compressed image. In such a system, it may be beneficial to store all the base colours separately to the modulation information.

In the embodiment described, it was assumed that the texturing filtering was done in a latter stage of the 3D hardware since such hardware would likely need to also support non-compressed textures. An alternative embodiment could simplify the hardware by incorporating the filtering as part of the texture decompression. This could be further extended to a cheaper filtering mode that approximates a bilinear, or more complex filter, by first filtering the modulation values and then applying the filtered modulation value to the up-scaled A and B signals. Because the modulation values are scalars, i.e. of a lower dimension than the originally output texels, this would reduce the overall hardware costs.

If higher rates of compression were required, the system could be adapted to use secondary look-up tables. This could be done in two independent ways: The stored colours could be replaced with indices into the table and/or the modulation information could also be reduced to an index into a different table.

An alternative embodiment of the 2 BPP could implement additional modulation modes. When the mode flag '103' of a block is set to 1, the precision of the T00 texel modulation value in that block would be reduced from 2 bits to 1 bit. The 'unused' bit would then become a further mode select flat, Sel1. If Sel1 is 0, then the 'grey' texes in FIG. 20 would be produced in exactly the same manner as previously described. When Sel1 is 1, however, the precision of T24's modulation value would be also be reduced to 1 bit. The 'unused' bit would then become yet another mode select flag, Set2. If Sel2 is 0, then the implied 'grey' pixel modulation values would be produced by averaging only the immediate two horizontal neighbours. If Sel2 is 1 then vertical neighbours are averaged.

Another alternative embodiment might use an additional mode bit to indicate other encodings, thus giving a total of four modes. Two would be the two modulation modes already presented, while the other two modes could be used to emulate modes. For example, one mode could be used so that within a block, the decompression approximates the behaviour of S3TC, so that rather than interpolating the A and B colours from block to block, they would remain constant within that block. Another additional mode would be to use the modulation values directly as indices into the local neighbourhood of colour values. Although not identical, this would have similar image properties to the "Colour Distribution" or FXT1 "CC_CHROMA" texture compression methods.

Alternative Application

The method can also be extended to support three (or higher) dimensional textures. The low frequency signals are simply interpolated over three (or more), dimensions rather than two, and the rectangular blocks of pixels are extended to become rectangular prisms.

Although the A & B signals have been described as representing colour images, the invention is by no means limited to this. For example, the A and B representative values could be monochromatic for grey scale images, or store two dimensions for UV perturbation texture mapping. Alternatively, the A & B values could be interpreted as bump map vector normals, either encoded as (x, y, z) or by the 2 dimensional optimisations presented in our EPO patent application 98 939 751.8.

Furthermore, the A and B signals need not be considered as 2 dimensional images. For example, discarding one of the dimensions, e.g. only using linear rather than bilinear interpolation, would allow the method to be applied to the compression of sound.

The technique can even be applied to related fields such as 3D modelling. It would provide a means of compression/storage/reconstruction of complex surface models by merging curved surfaces (e.g. those expressed with bicubic surfaces) with displacement mapping, by using bounding surfaces and a low precision modulating texture map.

It should be noted that features described by reference to particular figures and at different points of the description may be used in combinations other than those particularly described or shown. All such modifications are encompassed within the scope of the invention as set forth in the following claims.

With respect to the above description, it is to be realised that equivalent apparatus and methods are deemed readily apparent to one skilled in the art, and all equivalent apparatus and methods to those illustrated in the drawings and described in the specification are intended to be encompassed by the present invention. Therefore, the foregoing is considered as illustrative only, of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of compressing data, the data representing a plurality of elements of an array, the method comprising the steps of:
   a) compressing data by generating at least two sets of reduced size data by filtering the original data, the elements of each set of reduced size data being representative of a plurality of elements of the original data;
   b) using the original data to generate modulation data, each element of the modulation data specifying how to combine the sets of reduced size data to generate an approximation to the original data; and
   c) storing the sets of reduced size data and modulation data as compressed data.

2. A method according to claim 1, wherein the step of compressing data by generating the sets of reduced size data further comprises the steps of:
   a) reducing the size of the original data by filtering to reduce the number of elements to a set of representative elements forming intermediate reduced size data;
   b) scaling the intermediate reduced size data to produce first level low resolution data approximating the original data and having the same number of elements as the original data;
   c) generating difference data from the original data and the first level low resolution data;
   d) using the first level low resolution data and the difference data to generate at least two sets of second level low resolution data; and
   e) reducing the size of each set of second level low resolution data to produce the sets of reduced size data.

3. A method according to claim 2, wherein the step of generating the modulation data further comprises using the original data and the sets of second level low resolution data to generate a plurality of modulation values, each modulation value representing for each element of the original data how the sets of second level low resolution data should be combined to approximate the original data, each modulation value being stored as an element of the modulation data.

4. A method according to claim 2, wherein the step of generating the modulation data further comprises the steps of:
   a) using the original data and the sets of second level low resolution data to generate a plurality of modulation values, each modulation value representing for each element of the original data how the sets of second level low resolution data should be combined to approximate the original data; and
   b) generating modulation data having the same number of elements as the reduced size data, each element of the modulation data being representative of a plurality of modulation values.

5. A method according to claim 4, wherein each modulation value is stored in 2 bits.

6. A method according to claim 4, wherein every other modulation value is stored, each stored modulation value occupying 2 bits, and the remaining modulation values are represented implicitly by the average of the neighbouring stored modulation values.

7. A method according to claim 4, wherein each modulation value is stored in 1 bit.

8. A method according to claim 1, wherein only two sets of reduced size data are generated.

9. A method according to claim 2, further comprising computing principle axis data representing the direction of maximum components of the difference data.

10. A method according to claim 9, wherein computing the principle axis data further comprises the steps of:
 a) assuming that the average of each element of the difference data is zero and determining the covariance matrix of the difference data;
 b) determining the principle eigenvector of the covariance matrix; and
 c) using the principle eigenvector to locate the principle axis data of the difference data.

11. A method according to claim 9, further comprising calculation of filtered axis data by the following steps:
 a) computing the dot product of each element of the difference data with the principle axis data;
 b) producing aligned difference data by negating the element of the difference data if step (a) produces a negative scalar result;
 c) dividing the aligned difference data into overlapping blocks of elements;
 d) calculating the principle eigenvectors from the covariance matrix of each block;
 e) assembling the resulting principle eigenvectors to form third level low resolution data; and
 f) scaling the third level low resolution data to generate filtered axis data.

12. A method according to claim 11, wherein the second set of second level low resolution data is substantially the same as the first level low resolution data and the first set of second level low resolution data is calculated by subtracting the difference data from the first level low resolution data and further comprising the steps of:
 a) calculating the dot product of each element of the difference data with the corresponding element of the filtered axis data; and
 b) where the dot product calculated in step (a) is negative, swapping the values of corresponding elements in the first set of second level low resolution data and the second set of second level low resolution data.

13. A method according to claim 2, wherein the step of generating the modulation data comprises estimating the modulation value m, for each element of data using the function:

$$m = \frac{(\overline{O} - \overline{A}) \cdot (\overline{B} - \overline{A})}{(\overline{B} - \overline{A}) \cdot (\overline{B} - \overline{A})}$$

where $\overline{O}$ is the element of the original data,
 $\overline{A}$ is the corresponding element of the first set of second level low resolution data, and
 $\overline{B}$ is the corresponding element of the second set of second level low resolution data.

14. A method according to claim 2, further comprising grouping modulation values in overlapping local regions into at least two sets, using the grouped modulation values to improve the sets of second level low resolution data and calculating new modulation data from the improved sets of second level low resolution data.

15. A method according to claim 14, wherein optimised sets of second level low resolution data and modulation data are produced by iteratively improving the data.

16. A method according to claim 1, wherein step (a) of claim 1 comprises applying a wavelet transform to the original data, discarding high frequency information and retaining low frequency information in the reduced size data.

17. A method according to claim 16, wherein the wavelet transform is a modified linear wavelet transform.

18. A method according to claim 2, wherein the step of scaling the intermediate reduced size data is performed by bilinear expansion.

19. A method according to claim 1, wherein the sets of reduced size data are quantised before being stored.

20. A method according to claim 19, wherein one set of reduced size data is quantised to allow storage in 16 bits and another set of reduced size data is quantised to allow storage in 15 bits.

21. A method according to claim 20, wherein each element of each set of reduced size data comprise red, green, blue and alpha component data, the respective sizes of the component data being determined by whether the element is translucent or opaque.

22. A method according to claim 21, wherein for opaque elements the component data is stored as a one bit opaque flag, a five bit red component, a five bit green component, and the blue component is stored in five bits for one set of reduced size data and four bits for another set of reduced size data.

23. A method according to claim 21, wherein for translucent elements, the component data is stored as a one bit opaque flag, 3 bit alpha component, four bit red component, four bit green component and the blue component is stored in four bits for one set of reduced size data and three bits for another set of reduced size data.

24. A method according to claim 1, wherein the data is image data.

25. A method according to claim 24, wherein the image data is texture data.

26. A method according to claim 1, wherein each element of each set of reduced size data is representative of a block of elements of the original data measuring four elements by four elements.

27. A method according to claim 26, wherein four elements of the sets of reduced size data are required to apply texture to a single element of full size data.

28. A method according to claim 1, wherein the data is sound data.

29. A method of accessing an element of data which has been compressed for storage according to the method of claim 1, the method comprising the steps of:
 a) using the location of the element to be accessed to identify a first element of the compressed data, the first element representing the block into which the element to be accessed has been compressed;
 b) identifying three further elements of the compressed data, the three further elements corresponding to three blocks neighbouring the block into which the element to be accessed has been compressed, the three further elements being required to decompress the first element of the compressed data to generate an approximation to the element to be accessed; and
 c) using the first element of compressed data and up to all three further elements to generate a first approximation to the element of the original data to be accessed.

30. A method according to claim 29, wherein:
 a) if the element to be accessed corresponds to the representative element of the first block, the approximation to the element of the original data is simply the representative element of the first block;
 b) if the element to be accessed is in the same row as the representative element of the first block, the approximation to the element to be accessed is generated by interpolating the representative element of the first block using the representative element of the horizontally adjacent block;
c) if the element to be accessed is in the same column as the representative element of the first block, the approximation to the element to be accessed is generated by interpolating the representative element of the first block using the representative element of the vertically adjacent block; and
d) if the element to be accessed is in a different row and different column to the representative element of the first block, the approximation to the element to be accessed is generated by interpolating the representative element of the first block using the representative element of the vertically adjacent block and using the representative element of the horizontally adjacent block.

31. A method according to claim 30, wherein four elements in a 2×2 array of the original data are required to be accessed simultaneously, the top left element of the 2×2 array being used to identify the first block, the method comprising performing the operations described in claim 30 (a), (b), (c) and (d) by the following steps:
  a) inputting to a first rotate unit data (P0,Q0,R0,S0) where P0 is the representative element of the first block, Q0 is the representative element corresponding to the block horizontally adjacent to the first block, R0 is the representative element corresponding to the block vertically adjacent to the first block and S0 is the representative element corresponding to the remaining identified block;
  b) determining from the coordinates of the top left element of the 2×2 array to be accessed a first angle of rotation and a second angle of rotation;
  c) rotating in the first rotate unit the data (P0,Q0,R0,S0) according to the first angle of rotation and outputting to a first bilinear unit the resulting data (P,Q,R,S);
  d) performing in the first bilinear unit the following calculations:

$Pout=P$;

$Qout=(P+Q)/2$;

$Rout=(P+R)/2$;

$Sout=(P+Q+R+S)/4$;

and outputting Pout, Qout, Rout and Sout to a second rotate unit;
  e) subtracting the first angle of rotation from the second angle of rotation to determine a third angle of rotation;
  f) in the second rotate unit, rotating the data according the third angle of rotation to generate (P1,Q1,R1,S1) and outputting the data to a second bilinear filter unit;
  g) in the second bilinear filter unit, performing the calculations:

$Pout=P1$;

$Qout=(P1+Q1)/2$;

$Rout=(P1+R1)/2$;

$Sout\ (P1+Q1+R1+S1)/4$;

and outputting (Pout, Qout, Rout, Sout) to a third rotate unit;
  h) subtracting from 360 degrees the second rotate angle to generate a fourth rotate angle; and
  i) in the third rotate unit, rotating the data according the fourth rotate angle and outputting as the result the 2×2 array of elements to be accessed.

32. A method according to claim 31, wherein the rotate angles are determined by the least significant bits of the coordinates local to the first block of the top left element of the 2×2 array of elements to be accessed.

33. A method according to claim 32, wherein the coordinates local to the first block are calculated from the global coordinates of the top left element of the 2×2 array of the elements to be accessed by taking the two least significant bits of the x and y coordinates and mapping them to the relevant local coordinates.

34. A method according to claim 29, wherein the elements of the compressed data have been quantised before storage and the approximation to the original element of data to be accessed is converted to full precision before output.

35. A method according to claim 29, wherein the compressed data additionally comprises modulation data, an element of modulation data comprising a plurality of modulation values relating the corresponding representative element of the compressed data to each element of the block in the original data whereby the first approximation to the element of the original data to be accessed is modified using the appropriate modulation value to generate a second approximation to the element of original data to be accessed.

36. A computer program comprising program instructions for causing a computer to perform the process of claim 1.

37. A computer program according to claim 36, embodied on a record medium.

38. A computer program according to claim 36, stored in a computer memory.

39. A computer program according to claim 36, embodied in a read-only memory.

40. A computer program according to claim 36, carried on an electrical carrier signal.

41. A method according to claim 14, wherein the sets of second level low resolution data are improved during each iteration by selecting windows of the current modulation data and corresponding original data, computing the linear system of equations for localised sets of second level low resolution data, and solving for the set of second level low resolution data which produces the least squared error using singular value decomposition.

42. A method of decompressing compressed data, the compressed data comprising at least two sets of reduced size data and modulation data defining how the sets of reduced size data should be combined to generate an approximation to the uncompressed data, the method comprising the steps of:
  a) identifying for each set of N elements of the original data a small set of corresponding elements in each set of reduced size data;
  b) decompressing compressed data by using the small set of elements of reduced size data to expand each set of reduced size data to produce a set of N element low frequency data:
  c) identifying the corresponding element of the modulation data and separating the element of the modulation data into N modulation values;
  d) weighting corresponding elements of each set of N element low frequency data using the relevant modulation value to form sets of N element weighted low resolution data; and e) combining the corresponding elements of the sets of N element weighted low resolution data to generate an approximation to the N element portion of the original data.

43. A method according to claim 42, wherein steps (a), (b), (c) and (d) are performed on every element of each set of reduced size data and every element of the modulation data to generate an approximation to the entire original data.

44. A method according to claim 42, wherein steps (a), (b), (c) and (d) are performed on a block of P elements of each set of reduced size data and a block of the corresponding P elements of the modulation data to generate an approximation to a block of P×N elements of the original data.

45. A method according to claim 42, wherein an element of the sets of reduced size data and an element of the modulation data correspond to 16 elements of the original data.

46. A method according to claim 45, wherein an element of the sets of reduced size data and an element of the modulation data correspond to a block of elements of the original data arranged in a four element by four element array.

47. A method according to claim 44, wherein P is 4 and N is 16, the elements of the original data are estimated by processing four elements of the sets of reduced data and modulation data, each element of the sets of reduced size data and modulation data corresponding to a block of 4×4 elements of original data, the 4×4 blocks being arranged in a non-overlapping 2×2 array.

48. A method according to claim 42, wherein the original data is image data.

49. A method according to claim 48, wherein the image data is texture data.

50. A method according to claim 42, wherein an element of the sets of reduced size data and an element of the modulation data correspond to 32 elements of the original data.

51. A method according to claim 50, wherein an element of the sets of reduced size data and an element of the modulation data correspond to a block of elements of the original data arranged in a four element by eight element array.

52. A method of decompressing compressed texture data, each element of the compressed texture data representing a block of 4×4 elements of the original texture data, and the compressed texture data comprising at least two sets of reduced size data, modulation data and modulation flag data, each element of each set of reduced size data storing a block representative value of the value of the corresponding block of 4×4 elements of the original texture data, each element of the modulation data comprising 16 component modulation values for regenerating uncompressed texture data from the sets of reduced size data, and each element of the modulation flag data modifying the interpretation of the modulation data, the method comprising the steps of:
a) identifying a block of 2×2 elements of full size data required for texturing an element of an object;
b) identifying four elements of each set of reduced size data, modulation data and modulation flag data which are required to generate the 2×2 elements of the full size data; and
c) decompressing the four identified elements simultaneously to produce the required 2×2 elements of original texture data.

53. A method according to claim 52, wherein step (c) further comprises:

a) mapping the location of each element of the 2×2 block of texture data to determine whether the element lies at the block representative element of a 4×4 block;
b) for each element of the 2×2 block of texture data which lies at a location other than a block representative element, combining the representative value of the 4×4 block with at least one of the representative values of the neighbouring 4×4 blocks to generate a modified representative value;
c) for each element of the 2×2 block of texture data which lies in the block representative element of a block, setting the modified representative value to the representative value of the block; and
d) combining the modified representative values with the modulation data to generate 2×2 texture data.

54. A method according to claim 52, wherein the step of decompressing the four identified elements further comprises the steps of:
a) separating from the identified modulation data elements four relevant component modulation values;
b) combining the four relevant component values for each identified modulation data element with the corresponding element of the modulation flag data to form four sets of modulation decode data; and
c) applying each set of modulation decode data to the relevant element of the identified reduced size data to generate the required 2×2 elements of original texture data.

55. A method according to claim 52, wherein the decompressed texture data is applied to texture an object.

56. A method of compressing data comprising the steps of:
a) receiving data for compression;
b) separating the data for compression into non-overlapping uniform blocks;
c) locating the centre of a first block;
d) identifying the elements in the first block which are closest to the centre of the first block;
e) selecting a first block representative element from the identified elements of the first block;
f) compressing data by selecting block representative elements for each other block by selecting the element of that block in the corresponding location to the first block representative element; and
g) storing the representative element of each block as the compressed data.

57. A method according to claim 56, wherein the non-overlapping uniform blocks are 4 elements by 4 elements and the representative element of each block is the element in the third row and third column local to the block.

58. A method according to claim 56, further comprising the steps of:
a) for each block generating a plurality of modulation values, each modulation value relating the block representative element to an element of the block of data for compression; and
b) storing the modulation data in addition to the representative elements.

59. A method according to claim 58, wherein at least two sets of representative elements for each block of data for compression are generated and stored.

60. A method according to claim 59, wherein each modulation value specifies a weighting to be applied to each of the sets of representative elements in the estimation of an approximation to the data for compression.

61. Apparatus for compressing data comprising a processor having an input for receiving data to be compressed, an instruction set to perform the method of claim 56, and an output for outputting the compressed data.

62. Apparatus for estimating an element of original data from data compressed according to the method of claim 56, the apparatus comprising:
   a) an input for inputting the location of the element of original data to be estimated;
   b) first element identification means, coupled to the input, configured to identify a first element of the compressed data, the first element representing the block into which the element of original data has been compressed;
   c) further element identification means, coupled to the input and to the first element identification means, configured to identify three further elements of the compressed data, the three further elements corresponding to three blocks neighbouring the block into which the element of original data has been compressed, the three further elements being required to decompress the first element of the compressed data to generate an approximation to the element of original data; and
   d) processing means, coupled to the element identification means, configured to use the first element of compressed data and up to all of the three further elements to generate a first approximation to the required element of the original data.

63. Apparatus according to claim 62, wherein the processing means is configured to estimate the element of original data by:
   a) generating as the approximation to the required element the representative element of the first block if the element to be accessed corresponds to the representative element of the first block; or
   b) generating the approximation to the element to be accessed by interpolating the representative element of the first block using the representative element of the horizontally adjacent block if the element to be accessed is in the same row as the representative element of the first block; or
   c) generating the approximation to the required element by interpolating the representative element of the first block using the representative element of the vertically adjacent block if the element to be accessed is in the same column as the representative element of the first block; or
   d) generating the approximation to the required element by interpolating the representative element of the first block using the representative element of the vertically adjacent block and using the representative element of the horizontally adjacent block if the element to be accessed is in a different row and different column to the representative element of the first block.

64. Apparatus according to claim 63, wherein four elements in a 2×2 array to of the original data are required to be accessed simultaneously, the apparatus further comprising:
   a) means for identifying the first block using the top left element of the 2×2 array;
   b) first rotation estimation means for determining from the coordinates of the top left element of the 2×2 array to be accessed a first angle of rotation;
   c) second rotation estimation means for determining from the coordinates of the top left element of the 2×2 array to be accessed a second angle of rotation;
   d) third rotation estimation means, coupled to the first and second rotation estimation means, for subtracting the first angle of rotation from the second angle of rotation to determine a third angle of rotation;
   e) fourth rotation estimation means, coupled to the second rotation estimation means, for subtracting from 360 degrees the second angle of rotation to generate a fourth angle of rotation;
   f) a first rotate unit, coupled to the identification means for receiving (P0,Q0,R0,S0) where P0 is the element of the first block, Q0 is the element corresponding to the block horizontally adjacent to the first block, R0 is the element corresponding to the block vertically adjacent to the first block and S0 is the element corresponding to the remaining identified block and to the first rotation estimation means, the first rotate unit being configured to rotate the data (P0,Q0,R0,SO) according to the first angle of rotation and to output the resulting data (P,Q,R,S);
   g) a first bilinear unit, coupled to the output of the first rotate unit, configured to perform the following calculations:

$Pout=P;$ $Qout=(P+Q)/2;$ $Rout=(P+R)/2;$ $Sout (P+Q+R+S)/4;$ and to output Pout, Qout, Rout and Sout;
   h) a second rotate unit, coupled to the third angle rotation estimation means and to the output of the first bilinear unit for receiving (Pout, Qout, Rout, Sout), configured to rotate the data according the third angle of rotation to output (Pl,Q1,Rl,S1);
   i) a second bilinear filter unit, coupled to the output of the second rotate unit, configured to perform the calculations:

$Pout=Pl;$ $Qout=(Pl+Q1)/2;$ $Rout=(Pl+Rl)/2;$ $Sout=(Pl+Q1+Rl+S1)/4;$ and to output (Pout, Qout, Rout, Sout); and
   j) a third rotate unit, coupled to the fourth rotation estimation means and to the output of the second bilinear filter, configured to rotate the data according to the fourth rotate angle and to output as the result the 2×2 array of elements to be accessed.

65. Apparatus according to claim 64 wherein the first and second rotation estimation units are configured to determine the angle of rotation using the least significant bits of the coordinates local to the first block of the top left element of the 2×2 array of elements to be accessed.

66. Apparatus according to claim 61, wherein the elements of the compressed data have been quantised before input to the apparatus, the apparatus further comprising conversion means configured to convert the approximation to the required element to full precision before output.

67. Apparatus for compressing data comprising:
   a) an input for receiving data for compression;
   b) segmenting means, coupled to the input, for segmenting the data for compression into non-overlapping uniform blocks;
   c) first block identification means, coupled to the segmenting means, for locating the centre of a first block and for identifying the elements in the first block which are closest to the centre of the first block;

d) first selection means, coupled to the segmenting means and to the first block identification means, for selecting a first block representative element from the identified elements of the first block;

e) a plurality of further selection means, coupled to the segmenting means and to the first block identification means, for selecting block representative elements for each other block by selecting the. element of the other block in the corresponding location to the first block representative element to compress data; and f) an output, for outputting the representative element of each block as the compressed data.

68. Apparatus according to claim 67, further comprising a store, coupled to each selection means, for storing the representative element of each block as the compressed data.

69. Apparatus according to claim 68, wherein the segmenting means are configured to segment the data for compression into non-overlapping uniform blocks of 4 elements by 4 elements, and the selection means are configured to select the element in the third row and third column local to the block as the block representative element.

70. Apparatus according to claim 68, further comprising modulation data generation means, configured to generate for each block a plurality of modulation values, each modulation value relating the block representative element to an element of the block of data for compression.

71. Apparatus according to claim 70, wherein each selection means is configured to generate at least two sets of representative elements for each block of data for compression.

72. Apparatus according to claim 70, wherein the modulation data generation means is configured to relate each modulation value to a weighting to be applied to each of the sets of representative elements to generate an approximation to the data for compression.

73. Apparatus according to claim 67, wherein the compressed data additionally comprises modulation data, an element of modulation data comprising a plurality of modulation values relating the corresponding representative element of the compressed data to each element of the block in the original data; the apparatus further comprising modulation means for receiving the modulation data, identifying from the appropriate element of the modulation data the appropriate modulation value for the required element and modulating the first approximation to the required element using the appropriate modulation value to generate a second approximation to the required element.

74. Apparatus for compressing data, the apparatus comprising:

a) an input for receiving data to be compressed, the data representing a plurality of elements of an array;

b) filtering means, coupled to the input, for filtering the received data and for compressing data by generating at least two sets of reduced size data, each element of each set of reduced size data being representative of a plurality of elements of the received data;

c) modulation generation means, coupled to the input, for generating modulation data specifying how to combine the sets of reduced size data to generate an approximation to the received data; and d) an output, coupled to the filtering means and to the modulation generation means, for outputting the sets of reduced size data and modulation data as compressed data.

75. Apparatus according to claim 74, further comprising a store, coupled to the modulation generation means and to the filtering means, for storing as compressed data the sets of reduced size data and the modulation data and wherein the output may be coupled directly to the store for outputting the compressed data.

76. Apparatus according to claim 74, wherein the filtering means is further configured to:

a) filter the received data to produce intermediate reduced size data;

b) scale up the intermediate reduced size data to form first level low resolution data;

c) generate difference data from the received data and the first level low resolution data;

d) use the first level low resolution data and the difference data to generate at least two sets of second level low resolution data; and e) reduce the size of each set of second level low resolution data to generate the sets of reduced size data.

77. Apparatus according to claim 74, further comprising modulation data generating means, coupled to the filtering means, configured to generate modulation data for use in the decompression of the compressed data to estimate the original received data.

78. Apparatus according to claim 77, further comprising optimization means, coupled to the modulation data generating means and to the filtering means, for iteratively improving the sets of reduced size data and the modulation data.

79. Apparatus for decompressing compressed data, the compressed data comprising at least two sets of reduced size data and modulation data defining how the sets of reduced size data should be combined to generate an approximation to the uncompressed data, the apparatus comprising:

a) an input for receiving the compressed data;

b) interpolation means for decompressing compressed data, coupled to the input, for interpolating each set of reduced size data to generate at least two first approximations to each element of the uncompressed, original data element;

c) segmenting means, coupled to the input, for segmenting an element of modulation data into a plurality of modulation values;

d) weighting means, coupled to the interpolation means and to the segmenting means, for weighting corresponding elements of each set of interpolated reduced size data using the relevant modulation value; and e) a combiner, coupled to the weighting means, for combining the corresponding weighted interpolated reduced size data to generate a second approximation to the uncompressed data element.

80. Apparatus according to claim 79, configured to decompress four elements of reduced size data simultaneously.

* * * * *